United States Patent
Matsumura et al.

(10) Patent No.: US 7,336,799 B2
(45) Date of Patent: Feb. 26, 2008

(54) DIGITAL WATERMARK EMBEDDING DEVICE AND DIGITAL WATERMARK EMBEDDING METHOD

(75) Inventors: Yuuki Matsumura, Tokyo (JP); Osamu Nakamura, Saitama (JP); Syunichi Souma, Chiba (JP); Takashi Kohashi, Tokyo (JP)

(73) Assignee: Sony Corporation (JP)

( * ) Notice: Subject to any disclaimer, the term of this patent is extended or adjusted under 35 U.S.C. 154(b) by 494 days.

(21) Appl. No.: 10/162,368

(22) Filed: Jun. 3, 2002

(65) Prior Publication Data

US 2003/0012404 A1 Jan. 16, 2003

(30) Foreign Application Priority Data

Jun. 5, 2001 (JP) ............ P2001-169110

(51) Int. Cl.
*G06K 9/00* (2006.01)
*G06K 15/00* (2006.01)
*H04L 9/00* (2006.01)

(52) U.S. Cl. ............ 382/100; 713/176; 358/3.28

(58) Field of Classification Search ............ 380/210, 380/252, 287, 51, 54; 713/176; 370/522–529; 382/100, 232; 348/460, 463; 386/94; 725/20, 725/22

See application file for complete search history.

(56) References Cited

U.S. PATENT DOCUMENTS

| | | | |
|---|---|---|---|
| 5,960,081 A * | 9/1999 | Vynne et al. ............ 713/176 |
| 6,282,299 B1 * | 8/2001 | Tewfik et al. ............ 382/100 |
| 6,449,378 B1 * | 9/2002 | Yoshida et al. ............ 382/100 |
| 6,639,996 B2 * | 10/2003 | Suda ............ 382/100 |
| 6,711,276 B1 * | 3/2004 | Yoshiura et al. ............ 382/100 |
| 6,757,405 B1 * | 6/2004 | Muratani et al. ............ 382/100 |
| 2002/0114488 A1 | 8/2002 | Suda | |

FOREIGN PATENT DOCUMENTS

JP  11-355736  12/1999

OTHER PUBLICATIONS

Seong-Whan Kim et al., "Perceptually Tuned Robust Watermarking Scheme for Digital Video Using Motion Entropy Masking" International Conference on Consumer Electronics, Jun. 22, 1999, p. 104-105.

* cited by examiner

*Primary Examiner*—Bhavesh M Mehta
*Assistant Examiner*—Charles Kim
(74) *Attorney, Agent, or Firm*—Lerner, David, Littenberg, Krumholz & Mentlik, LLP

(57) ABSTRACT

A digital watermark embedding device uses frame correlation to perform motion detection on an input temporally sequential video signal. Based on detected motion information, when a picture is moving at such a speed that a stationary pattern cannot be visually perceived, the device controls a digital watermark pattern to be stationary, while, when a picture is moving at such a speed that a stationary pattern can be visually perceived, the device moves the digital watermark pattern to follow the motion. This makes it possible to effectively superimpose a digital watermark pattern on the input video signal.

12 Claims, 15 Drawing Sheets

FIG. 6A    FIG. 6B
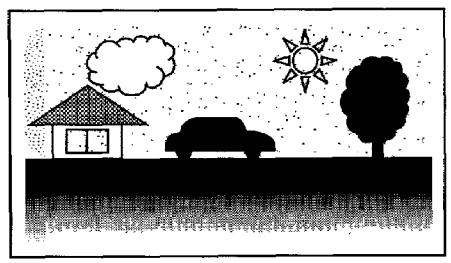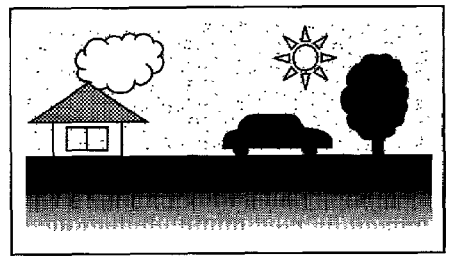
FIG. 6C
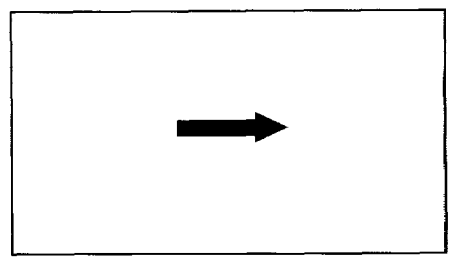
FIG. 6D    FIG. 6E
| Watermark Watermark Water |
| Watermark Watermark Wate |
| k Watermark Watermark Wat |
| rk Watermark Watermark Wa |
| ark Watermark Watermark W |
| mark Watermark Watermark |
| rmark Watermark Watermark |
| ermark Watermark Watermar |
| termark Watermark Waterma |
| atermark Watermark Waterm |
| Watermark Watermark Water |
| Watermark Watermark Wate |

DIGITAL WATERMARK EMBEDDING DEVICE AND DIGITAL WATERMARK EMBEDDING METHOD

CROSS-REFERENCE TO RELATED APPLICATIONS

The present invention claims priority from Japanese Patent Application Nos. 2001-169110 filed on Jun. 5, 2001 and 2001-169111 filed on Jun. 5, 2001.

BACKGROUND OF THE INVENTION

1. Field of the Invention

The present invention relates to a technology in which additional information such as copyright information and editing information can be embedded in or read from data such as a picture. The present invention relates to, for example, a digital watermark embedding device and method that execute a process (called "digital watermarking" or "data hiding") of embedding a digital watermark in a picture as additional information that cannot be perceived when the picture is observed normally.

2. Description of the Related Art

With advances in digital technology, digital recording/playback devices that eliminate problems caused by repeatedly executing playback processing, such as picture quality deterioration and sound quality deterioration, have come into widespread use. In addition, various types of digital content such as various pictures and pieces of music have become distributable by using media such as digital versatile disks (DVDs) and compact disks (CDs) or by networks.

Unlike analog recording and playback, in digital recording/playback technology, quality similar to that of the original data is maintained because the data does not deteriorate even if the data is repeatedly recorded or played back. Widespread use of this digital recording/playback technology results in a flood of unauthorized copies, which is a big problem from the point of view of copyright protection.

To cope with copyright infringement caused by unauthorized copies of digital content, a system for preventing unauthorized copying is known. This system functions by adding copy control information for controlling copying of digital content, reading the copy control information in a content recording or playback mode, and executing processing in accordance with the read copy control information.

There are various systems for controlling copying of content. For example, among them, a common one is the Copy Generation Management System (CGMS). When the CGMS is applied to analog video signals (which may be called "CGMS-A"), among 20 bits of additional information to be superimposed on an effective video part in one specified horizontal interval in the vertical blanking period of the brightness signal, for example, on an effective video part in the twentieth horizontal interval in the case of an NTSC (National Television System Committee) signal, two bits are superimposed as copy control information. When the CGMS is applied to digital video signals (which may be called "CGMS-D"), the signals are transmitted in a form including 2-bit copy-control information as additional information to be added to digital video data.

In the CGMS, the 2-bit information (hereinafter referred to as the "CGMS information") has the following meanings: "00" indicates that content may be copied; "10" indicates that content may be copied once (copying is permitted for only one generation); and "11" indicates that content is prohibited from being copied (strict prohibition of copying).

The above CGMS is one type of common copy control system. In addition, there are other systems for protecting the copyright of content. For example, digital broadcasting by broadcasting stations employs a copy generation control system that, by storing a digital copy control descriptor in program information (i.e., service information) included in transport stream (TS) packets constituting the digital data, performs copy generation control in accordance with the digital copy control descriptor when data received by a receiver is recorded in a recording unit.

Since the above descriptor is added as bit data to, for example, the content header, it is impossible to completely exclude the possibility of interpolation of the added data. A system that is advantageous in excluding the possibility of data interpolation is digital watermarking. It is impossible to view or perceive a watermark under normal playback conditions of the content (picture data or audio data). Embedding and detection of the watermark can be performed only by executing a particular algorithm or by a particular device. When content is processed by a device such as a receiver or a recording/playback unit, by detecting the watermark and controlling the processing in accordance with the watermark, reliable control can be realized.

In the method that employs digital watermarking to protect of the copyright of content, etc., which is transmitted by using a recording medium such as an optical disk, or by media such as satellite, terrestrial waves, or cable from a broadcasting station or the like, signals generated by modulating copyright data is recorded in a form in which they can be superimposed on video signals or audio signals. In the digital network age in which various types of digital content, such as pictures, sound, and data, might be copied and distributed without deteriorating, watermarking is a major technology of protecting copyright by embedding information in content itself.

Information that can be embedded by watermarking includes, not only the above copy control information, but also various types of information such as content copyright information, content modification information, content structure information, content processing information, content editing information, and content-playback-system information. For example, by using watermarks to embed pieces of editing information in a content editing mode, recognition of each process step can be performed in each editing step by referring to its watermark. This editing information is embedded as a new watermark in the content, for example, in each step of editing the content, and a final process such as removal of the watermark from the content is performed.

Various techniques for embedding and detecting digital watermarks in data have been proposed. A common digital watermarking technique is a technique based on data representing original signals, for example, statistical properties of pictures. Based on the statistical properties of picture signals such as digital video signals, a method that embeds a digital watermark while using pseudorandom-noise-series (PN-series) random-number data as a basic pattern is described below. For brevity of description, it is assumed that brightness-signal frame data has a horizontal size of eight pixels and a vertical size of six pixels.

First, PN-series random-number data PN is set as follows:

$$WN = PN = \begin{pmatrix} +1 & -1 & +1 & +1 & -1 & +1 & -1 & -1 \\ +1 & +1 & -1 & -1 & -1 & +1 & -1 & +1 \\ -1 & +1 & +1 & -1 & -1 & +1 & -1 & +1 \\ +1 & -1 & -1 & -1 & +1 & -1 & -1 & -1 \\ -1 & -1 & +1 & +1 & +1 & -1 & -1 & +1 \\ +1 & +1 & -1 & +1 & -1 & -1 & +1 & -1 \end{pmatrix} \quad (1)$$

The PN-series random-number data PN is generated so that its sum is statistically zero. Next, embedding information DC is processed by performing a spread spectrum method, using the random-number data PN having the properties indicated by expression (1). In other words, when the polarity of the embedding information DC is "1", by using the pattern of the random-number data PN without changing it, a digital watermark pattern WM is expressed as follows:

$$PN = \begin{pmatrix} +1 & -1 & +1 & +1 & -1 & +1 & -1 & -1 \\ +1 & +1 & -1 & -1 & -1 & +1 & -1 & +1 \\ -1 & +1 & +1 & -1 & -1 & +1 & -1 & +1 \\ +1 & -1 & -1 & -1 & +1 & -1 & -1 & -1 \\ -1 & -1 & +1 & +1 & +1 & -1 & -1 & +1 \\ +1 & +1 & -1 & +1 & -1 & -1 & +1 & -1 \end{pmatrix} \quad (2)$$

When the polarity of the embedding information DC is "0", by using a pattern in which the random-number data PN is inverted, the digital watermark pattern WM is expressed as follows:

$$WN = -PN = \begin{pmatrix} -1 & +1 & -1 & -1 & +1 & -1 & +1 & +1 \\ -1 & -1 & +1 & +1 & +1 & -1 & +1 & -1 \\ +1 & -1 & -1 & +1 & +1 & -1 & +1 & -1 \\ -1 & +1 & +1 & +1 & -1 & +1 & +1 & +1 \\ +1 & +1 & -1 & -1 & -1 & +1 & +1 & -1 \\ -1 & -1 & +1 & -1 & +1 & +1 & -1 & +1 \end{pmatrix} \quad (3)$$

When the embedding information DC consists of a plurality of information bits, by dividing, for example, the brightness-signal frame data into appropriate smaller regions, the information bits may be set to correspond to the smaller regions. Also, by using, for example, a plurality of different digital watermark patterns that are orthogonal to one another, the information bits may be set to correspond to the digital watermark patterns. Alternatively, these techniques may be used in combination.

In addition, in a picture signal such as a digital video signal, it is assumed that frame data DV1 representing a pixel level of the brightness signal in certain frame data is expressed by the following expression. In the picture signal, close brightness signals appear to have a similar pixel level, and the pixel levels of adjacent pixels are appropriately set.

$$DV2 = DV1 + WM = \begin{pmatrix} 51 & 50 & 53 & 55 & 51 & 53 & 49 & 48 \\ 50 & 51 & 50 & 52 & 53 & 54 & 49 & 51 \\ 47 & 51 & 51 & 49 & 52 & 53 & 48 & 49 \\ 50 & 48 & 49 & 47 & 50 & 51 & 49 & 48 \\ 47 & 47 & 51 & 50 & 48 & 49 & 51 & 51 \\ 50 & 51 & 51 & 52 & 50 & 51 & 56 & 52 \end{pmatrix} \quad (4)$$

Digital watermark embedding is implemented by adding the digital watermark pattern WM to frame data DV1 of the brightness signal. When the polarity of the digital embedding information DC is "1", the digital watermark pattern WM expressed by expression (2) is added to the brightness signal expressed by expression (4). Frame data DV2 in which the digital watermark pattern WM is imbedded is expressed as follows:

$$DV1 = \begin{pmatrix} 50 & 51 & 52 & 54 & 52 & 52 & 50 & 49 \\ 49 & 50 & 51 & 53 & 54 & 53 & 50 & 50 \\ 48 & 50 & 50 & 50 & 51 & 52 & 49 & 48 \\ 49 & 49 & 50 & 48 & 49 & 50 & 50 & 49 \\ 48 & 48 & 50 & 49 & 47 & 50 & 52 & 50 \\ 49 & 50 & 52 & 51 & 51 & 52 & 55 & 53 \end{pmatrix} \quad (5)$$

In order to detect embedding information DC from frame data DV2 of the brightness signal in which the digital watermark pattern WM is embedded, PN-series random-number data PN identical to that used for embedding is used. The inner product P1 of original frame data DV1 of the brightness signal and random-number data PN has a value expressed as follows:

$$P1 = DV1 \cdot PN = 1 \quad (6)$$

Based on the statistical properties of the picture signal, the inner product P1 is a value close to zero. The inner product P2 of the frame data DV2 of the brightness signal in which digital watermark pattern WM is embedded and random-number data PN has, when the polarity of embedding information DC is "1", a value expressed as follows:

$$\begin{aligned} P2 &= DV2 \cdot PN \quad (7)\\ &= (DV1 + WM) \cdot PN \\ &= (DV1 + PN) \cdot PN \\ &= P1 + PN2 \\ &= 1 + 48 \end{aligned}$$

When the polarity of the embedding information DC is "0", the inner product P2 has a value expressed as follows:

$$\begin{aligned} P2 &= DV2 \cdot PN \quad (8)\\ &= (DV1 + WM) \cdot PN \\ &= (DV1 - PN) \cdot PN \\ &= P1 - PN2 \\ &= 1 - 48 \end{aligned}$$

In other words, the absolute value of the inner product P2 is a value close to the random-number data PN itself. For each of several pictures, by calculating the inner product P1 of original frame data DV1 of the brightness signal and random-number data PN, and the inner product P2 of the frame data DV2 of the brightness signal in which the digital watermark pattern WM is embedded and random-number data PN, the distributions of inner products P1 and P2 can be represented by the probability density function shown in FIG. 1. Accordingly, by setting an appropriate threshold value TH, which is not negative, it can be determined whether or not digital watermark information is embedded as the digital watermark pattern WM, and it can be determined whether the polarity of the information is positive or negative, as shown below:

When $P2 \leq -TH$, watermark information is embedded (polarity "0").

When $|P2|<TH$, no watermark information is embedded.

When $P2 \leq TH$, watermark information is embedded (polarity "1"). (9)

As the above expression (9) shows, the embedded information DC can be detected from frame data D2 of the brightness signal in which digital watermark pattern WM is embedded.

For the actual implementation of digital watermarking, two points are important: one is reliability of the digital watermark detection and the other is the influence on the picture quality of the digital watermark information. In order to accurately determine whether or not watermark information is embedded, a threshold value TH must be set so that, in FIG. 1, the probability density function when the digital watermark pattern WM is embedded and the probability density function when the digital watermark pattern WM is not embedded can be separated with good precision. However, actually, the skirts of both functions overlap with each other, so that it is difficult to select a threshold value TH that enables determination of whether or not the digital watermark pattern WM is embedded. The probability that it may be determined that digital watermark information is embedded, even though the information is not embedded, is called a "false positive value". To guarantee secure distribution of content, an extremely small false positive value is required. Accordingly, to increase the reliability of digital watermark detection, a process that uses nonnegative scalar value C to increase the intensity of the embedded digital watermark information is executed. Frame data DV2 of the brightness signal generated when digital watermark information is embedded using the embedding intensity increased by using scalar value C has a value expressed as follows:

$$DV2 = DV1 + CWM \quad (10)$$

The inner product P2 of the watermark-embedded frame data DV2 and the random-number data PN may be sufficiently increased. Specifically, the watermark-embedded frame data DV2 has a value expressed as follows:

$$P2 = DV2 \cdot PN \quad (11)$$
$$= (DV1 + CWM) \cdot PN$$
$$= (DV1 \pm CPN) \cdot PN$$
$$= P1 \pm CPN2$$

When the embedding intensity is increased as described above, the influence on the digital watermark picture quality cannot be ignored. The reliability of digital watermark detection and the influence on the picture quality of the watermark information are in a trade-off relationship.

The embedded digital watermark information must be correctly detected even if a digital-watermark-embedded picture is attacked by various techniques such as picture-format conversion, digital-to-analog conversion, MPEG compression, filtering, clipping, resizing, and rotation. There is a possibility that those who unlawfully steal copyright may maliciously attack digital-watermark-embedded pictures. Accordingly, various techniques have been proposed to enhance the resistance to these attacks, and to ensure the reliability of digital watermark detection. Nevertheless, a digital watermarking technology having strong resistance to all types of attacks has not been developed yet, and prompt measures are required.

FIG. 2 illustrates embedding of copy control information by using digital watermark information and copy control based on digital watermark detection.

When a digital video signal DV as a video source is transmitted from a broadcasting station or the like by using a medium such as satellite, terrestrial waves, or cable, a digital watermark embedding device 1 adds digital watermark information DC to the digital video signal DV, and transmits the obtained signal. The digital watermark information DC to be embedded includes video-source copyright information, and "Copy Once" information indicating that content may be copied once.

When the digital video signal DV that is transmitted after the "Copy Once" information (digital watermark information DC) is embedded therein by digital watermarking is received and played back by a set-top box or the like, the embedded digital watermark information DC is detected from the playback video signal by a digital watermark detecting device 3 built into a recording apparatus 2.

When the detecting device 3 in the recording apparatus 2 detects the "Copy Once" information, the digital watermark information DC is rewritten and recorded on an optical disk 5 by a digital watermark rewriting device 4 built into the recording apparatus 4. The rewritten digital watermark information DC includes video-source copyright information, and "No More Copy" information indicating that no further copies of the content can be made.

When the optical disk 5 on which a copy of the digital video signal DV is recorded as described above is provided, for example, as a commercially distributed medium, if someone attempts to copy the content of the provided optical disk 5 by a recording apparatus 6 again, another digital watermark detecting device 3 built into a recording apparatus 6 detects the embedded digital watermark information DC from the played back digital video signal DV.

Since the detected digital watermark information DC is the "No More Copy" information, indicating that no more copies of the content may be made, the recording apparatus 6 performs a process in accordance with the "No More Copy" information, that is, it stops recording the digital video signal DV on the optical disk 7. This is used for copy generation management.

Also, when the digital watermark embedding device 1 produces an optical disk 8 storing the digital video signal DV as a video source, it can execute the process of recording content to the optical disk 8 after embedding, in the digital video signal DV, digital watermark information DC having "Never Copy" information indicating that content is prohibited from being copied.

When the optical disk 8 on which the digital video signal DV is recorded is commercially distributed, if someone attempts to play back the content of the distributed optical disk 8 and copy it to another recording medium, the digital watermark detecting device 3 in the recording apparatus 6 detects the embedded digital watermark information DC from the played back digital video signal DV.

Since the detected watermark information DC is the "Never Copy" information indicating that content is prohibited from being copied, the recording apparatus 6 performs a process in accordance with the "Never Copy" information, that is, it stops recording to the optical disk 8. This prevents unauthorized copying.

In order to prevent a digital watermark from affecting the picture quality while ensuring the reliability of watermark detection, a digital watermark embedding technique that effectively uses human visual characteristics has been proposed. However, a method adapted for superimposing a watermark pattern on a picture while following the motion of the picture has not yet been implemented.

SUMMARY OF THE INVENTION

The present invention is made in view of the above-described problems, and it is an object of the present invention to provide a digital watermark embedding device and method in which, when digital watermark information is embedded in a picture, by detecting the motion of the picture, the watermark information is embedded so to be imperceptible to the human eye while ensuring the reliability of watermark detection.

It is a more specific object of the present invention to provide a digital watermark embedding device and method that, by optimizing a digital watermark pattern in accordance with the stationary or moving state of a picture, digital watermark information is embedded so to be imperceptible to the human eye while ensuring the reliability of watermark detection.

To these ends, according to an aspect of the present invention, a digital watermark embedding device for executing an embedding process of embedding digital watermark information in a picture signal is provided. The digital watermark embedding device includes a digital-watermark-pattern generating unit for generating a digital watermark pattern based on embedding information, a motion detecting unit for detecting a motion vector of said picture signal for said embedding process, a modulating unit for executing a modulating process of modulating the digital watermark pattern so as to follow the motion represented by the motion vector, and an embedding unit for embedding the modulated digital watermark pattern in said picture signal.

According to another aspect of the present invention, a digital watermark embedding method for executing an embedding process of embedding digital watermark information in a picture signal is provided. The digital watermark embedding method includes a digital-watermark-pattern generating step for generating a digital watermark pattern based on embedding information, a motion detecting step for detecting a motion vector of said picture signal for said embedding process, a modulating step for executing a modulating process of modulating the digital watermark pattern so as to follow the motion represented by the motion vector, and an embedding step for embedding the modulated digital watermark pattern in said picture signal.

As is clear from the above description, according to the present invention, when executing a process of embedding digital watermark information in an input digital video signal, motion detection is performed for the input video signal when it is temporally sequential, and based on the detected motion information, when a still picture is found, a digital watermark pattern is also controlled to be stationary, and when a moving picture is found, the digital watermark pattern is also moved to follow the motion, whereby the digital watermark information can be embedded in the input digital video signal so as not to be visually perceived. This can effectively prevent the digital watermark pattern from affecting the picture quality, without changing an embedding intensity for the entire picture.

According to the present invention, when executing a process of embedding digital watermark information in an input digital video signal, motion detection is performed for the input digital video signal when it is temporally sequential, and based on the detected motion information, when it is found that a picture is moving at such a speed that a stationary pattern cannot be visually perceived, a digital watermark pattern is controlled to be stationary, and when it is found that a picture is moving at such a speed that the stationary pattern can be visually perceived, the digital watermark pattern is also moved to follow the motion. This makes it possible to effectively superimpose the digital watermark information on the input digital video signal by adaptively reducing the number of arithmetic operations.

According to the present invention, when executing a process of embedding digital watermark information in an input digital video signal, motion detection is performed for the input digital video signal when it is temporally sequential, and based on the detected motion information, an embedding intensity for a moving picture is set to be greater than that for a still picture, and a digital watermark pattern is modulated, whereby the digital watermark information can be embedded in the input digital video signal so as to increase precision of digital watermark detection. This can effectively prevent the digital watermark pattern from affecting the picture quality, and can ensure the reliability of digital watermark detection.

According to the present invention, after detecting a picture motion, a digital watermark pattern is embedded so as to follow the motion, or after adjusting an embedding intensity, a digital watermark pattern is embedded. Thus, this can effectively prevent the digital watermark pattern from affecting the picture quality, while ensuring the reliability of digital watermark detection. Accordingly, content distribution in the digital network age, a highly reliable copyright protecting system suppressing deterioration picture quality can be formed.

Further objects, features and advantages of the present invention will become apparent from the following description of the preferred embodiment with reference to the attached drawings.

BRIEF DESCRIPTION OF THE DRAWINGS

FIGS. 6A, 6B, 6C, 6D, and 6E are illustrations of motion vector detection and digital watermark embedding in the digital watermark embedding device of the present invention;

DESCRIPTION OF THE PREFERRED EMBODIMENTS

A digital watermark embedding device and method of the present invention are described below with reference to the attached drawings.

First Example of Digital Watermark Embedding Device

Figure 1:
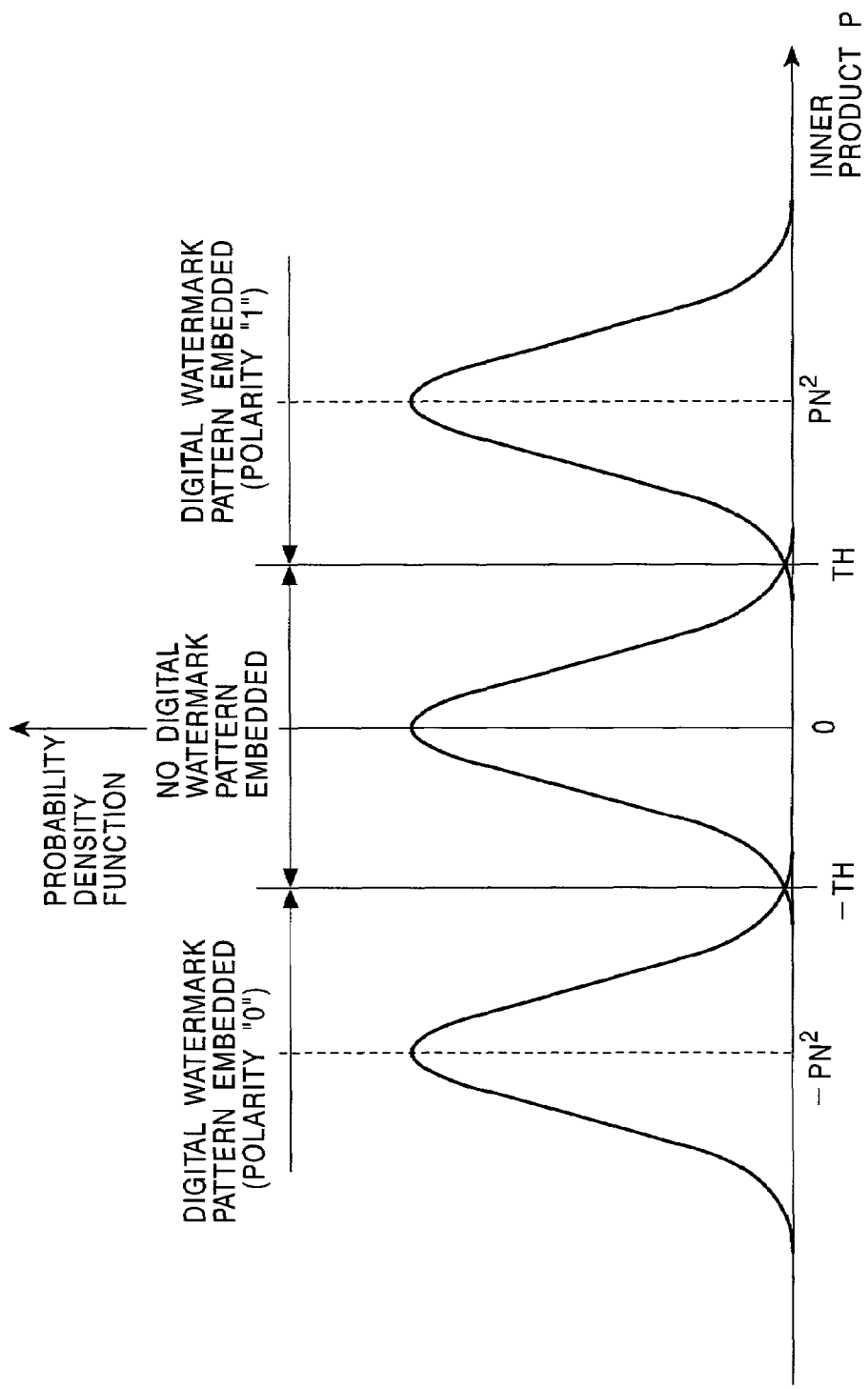
FIG. 1 is a graph which illustrates digital watermark detection and which shows the probability density functions of inner products.
Figure 2:
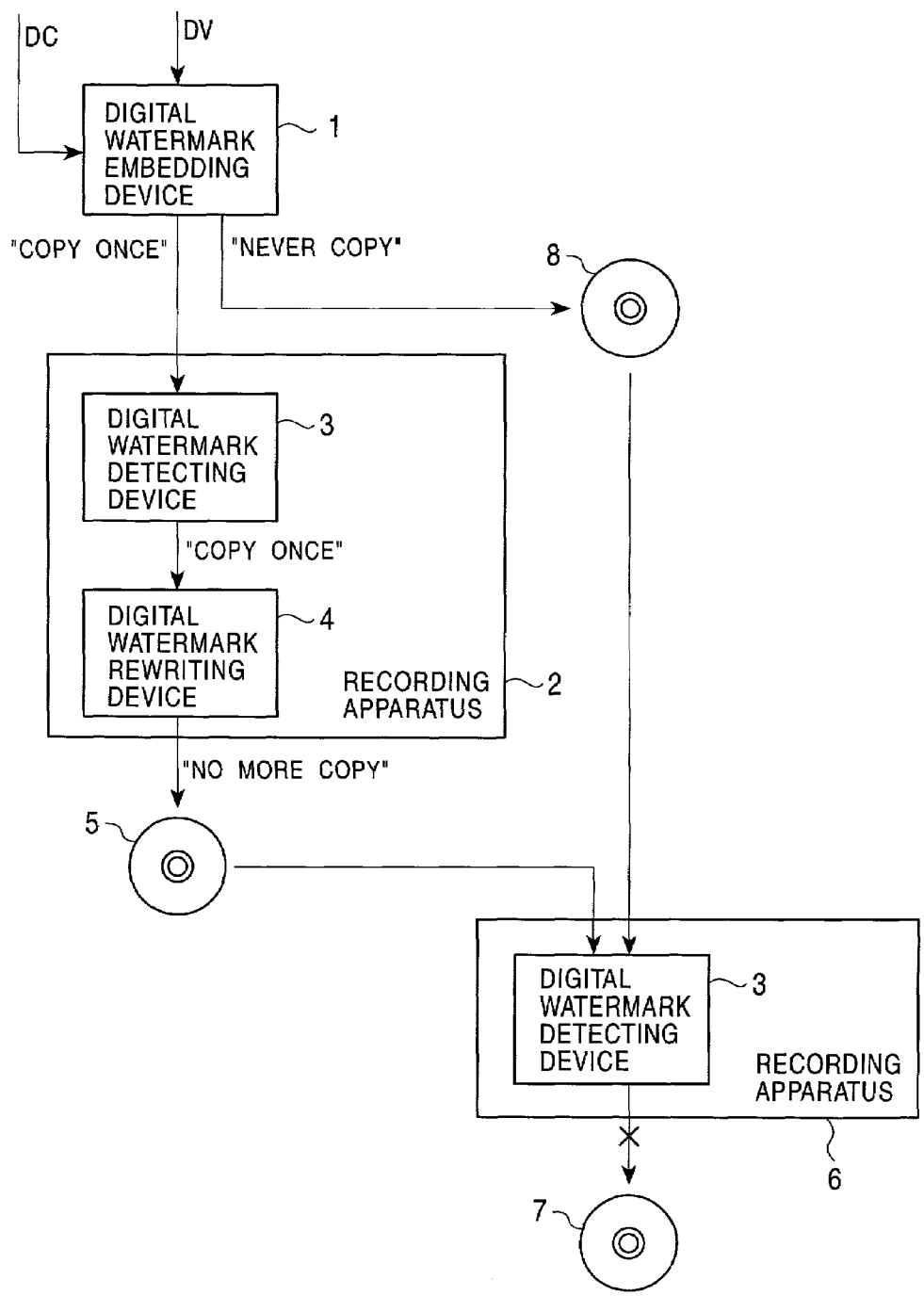
FIG. 2 is a block diagram showing a copyright protecting process using digital watermark embedding and detecting processes.
Figure 3:
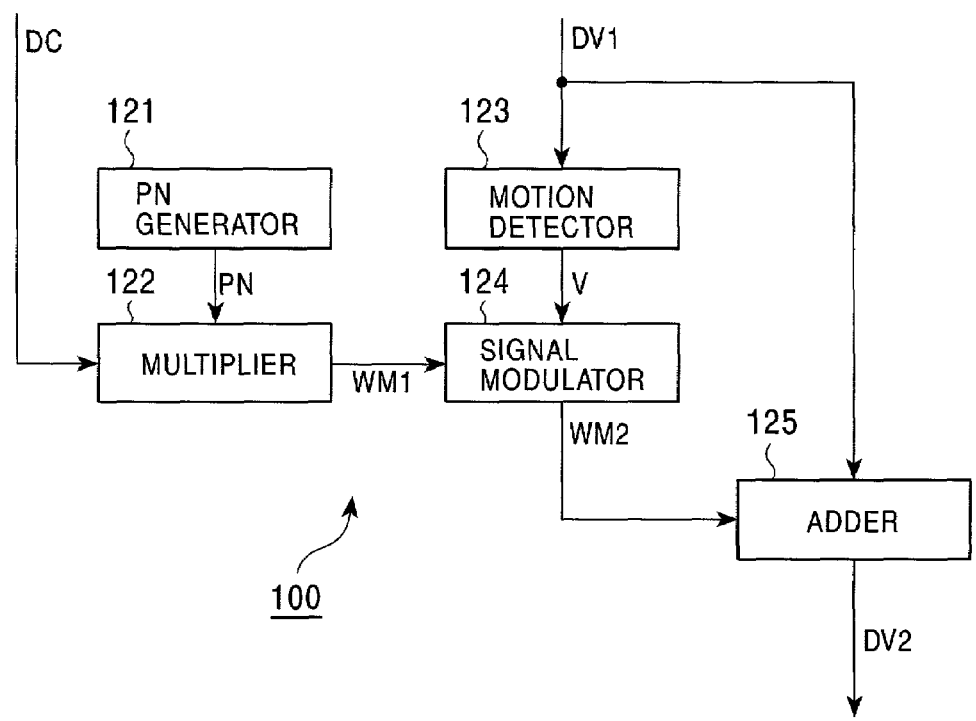
FIG. 3 is a block diagram showing a digital watermark embedding device of the present invention.

FIG. 3 shows the structure of a digital watermark embedding device 100 according to an embodiment of the present invention. In the digital watermark embedding device 100, PN-series random-number data PN is generated by a PN generator 121 and is used as a basic pattern to embed digital watermark information. Digital watermark embedding information DC is processed using random-number data PN by a spread spectrum method to generate a digital watermark pattern WM1 that is difficult to analyze.

The digital watermark embedding information DC includes, as information in accordance with a signal in which the digital watermark embedding information DC is embedded, copy control information representing one of "Copy Free" information indicating that content may be copied freely, "Copy Once" information indicating that content may be copied once, and "Never Copy" information indicating that content may never be copied.

In the digital watermark embedding device 100, a motion detector 123 detects a motion of a picture from a sequentially input digital video signal DV1 and outputs motion information V. The motion detection in the motion detector 123 is performed by analyzing an input picture by using a picture analyzing technique in which human visual characteristics are considered.

In the digital watermark embedding device 100 according to the embodiment of the present invention, based on the motion information V detected by the motion detector 123, by executing a process in which, when the picture is stationary, the digital watermark pattern WM1 is also controlled to be stationary, and when the picture is moving, the digital watermark pattern WM1 is also moved to follow the moving picture, the digital watermark information is embedded so to be imperceptible to the human eye. This can effectively prevent the digital watermark information from affecting the picture quality, without changing the intensity for the entire picture of embedding the digital watermark information.

Figure 4:
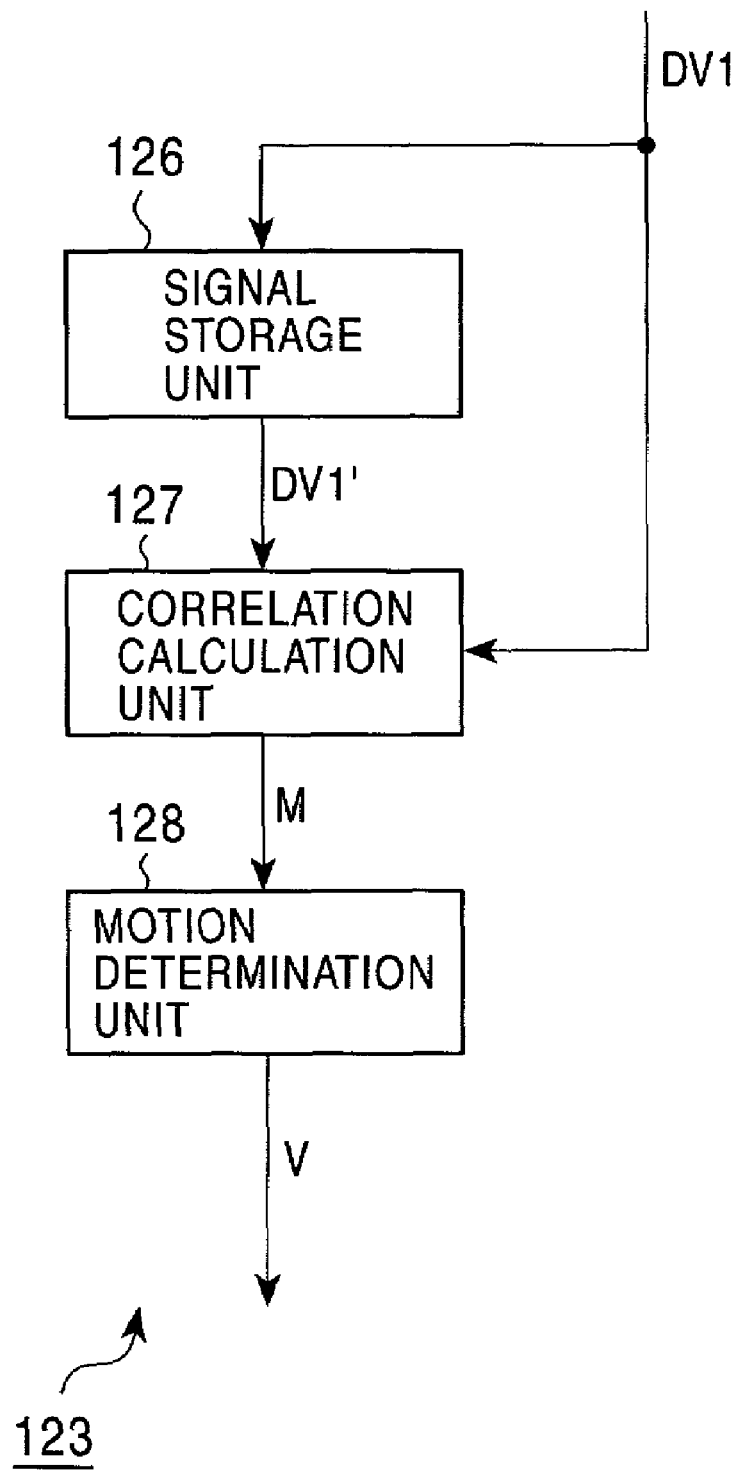
FIG. 4 is a block diagram showing the motion detector of the digital watermark embedding device shown in FIG. 3.

FIG. 4 shows the detailed structure of the motion detector 123 in the digital watermark embedding device 100. In the motion detector 123, a signal storage unit 126 stores the sequentially input digital video signal DV1 in units of frames, and outputs a delayed digital video signal DV1' that is delayed for a frame. In this embodiment, by using a feature in which two temporally sequential picture signals represent highly correlative pixel levels, a motion vector that maximizes frame correlation in an optimized search range is determined, whereby picture-signal motion detection is performed. A correlation calculation unit 127 outputs correlation information M by calculating frame correlation between the delayed digital video signal DV1' output from the signal storage unit 126 and the input digital video signal DV1. In this embodiment, between pixels corresponding to two temporally sequential digital video signals DV1 and DV1', the absolute value of their brightness values is calculated, and the sum of matching values in a frame is used as an index of frame correlation. In other words, a matching value in the motion vector search range ($V_x$, $V_y$) is expressed as follows:

$$M(V_x, V_y) = \Sigma |DV1'(x, y) - DV1(x+V_x, y+V_y)| \quad (12)$$

Next, after changing the motion vector search range, by repeatedly performing the calculation in expression (12), all matching values for motion vectors are calculated. This obtains a frame-correlation plane in the motion vector search range ($V_x$, $V_y$).

Based on the correlation information M output from the correlation calculation unit 127, a motion determination unit 128 determines a motion vector ($V_x$, $V_y$) in which the frame correlation is maximum, and outputs motion information V. In other words, a motion vector ($V_x$, $V_y$) that gives maximum correlation (the minimum matching value in this case) in the frame-correlation plane obtained in the correlation calculation unit 127 is output as motion information V. The motion information V is expressed as follows:

$$V(x, y) = \arg\min M(V_x, V_y) \quad (13)$$

Referring back to FIG. 3, the description of the digital watermark embedding device 100 is continued. The motion information V output from the motion detector 123 is input to a signal modulator 124. Based on the motion vector V, the signal modulator 124 modulates the digital watermark pattern WM1 to generate a digital watermark pattern WM2 in which human visual characteristics are considered. The digital watermark pattern WM2 is output to an adder 125.

When the input digital video signal DV1 represents a stationary state, the signal modulator 124 modulates the digital watermark pattern WM1 to generate the digital watermark pattern WM2 by regarding the digital watermark pattern WM1 as stationary in accordance with the motion information V=(0, 0) which is output from the motion detector 123. When the input digital video signal DV1 represents a motion caused by the motion information V=($V_x$, $V_y$) the signal modulator 124 generates the digital watermark pattern WM2 by performing a modulating process in which the digital watermark pattern WM1 is moved to follow the picture in accordance with the motion information $V=(V_x, V_y)$ which is output from the motion detector 123. The digital watermark pattern WM2 is output to an adder 125. Specifically, based on the motion information V output as a value corresponding to picture moving speed and direction, the signal modulator 124 executes the process of modulating the digital watermark pattern WM1 so that it is moved to follow the moving picture represented by the motion vector. In this modulating process, a stationary digital watermark pattern can be embedded in a still picture, while a digital watermark pattern following a motion can be embedded in a moving picture, so that the digital watermark information can be embedded so to be imperceptible to the human eye. This can effectively prevents the digital watermark information from affecting the picture quality, without changing the intensity for the entire picture of embedding the digital watermark information.

The adder 125 outputs the digital video signal DV2 by adding the digital watermark pattern WM2 generated by modulating the digital watermark pattern WM1 to the input digital video signal DV1.

The digital video signal DV2 is transmitted in a form encoded by a predetermined encoder from a broadcasting station or the like by media such as satellite or terrestrial waves, and a cable, and is distributed in a form recorded on a recording medium such as an optical disk.

As described above, digital watermark information can be embedded so to be imperceptible to the human eye because the digital watermark embedding device 100 in FIG. 3 acquires motion information on a picture in which digital watermark information is embedded, and executes in accordance with the motion information a process of modulating a digital watermark pattern so that a stationary digital watermark pattern is added to a still picture, and for a moving picture, a digital watermark pattern is embedded so as to follow the motion. This can effectively prevent the digital watermark information from affecting the picture quality, without changing the intensity for the entire picture of embedding the digital watermark information.

Digital Watermark Embedding Process

Figure 5:
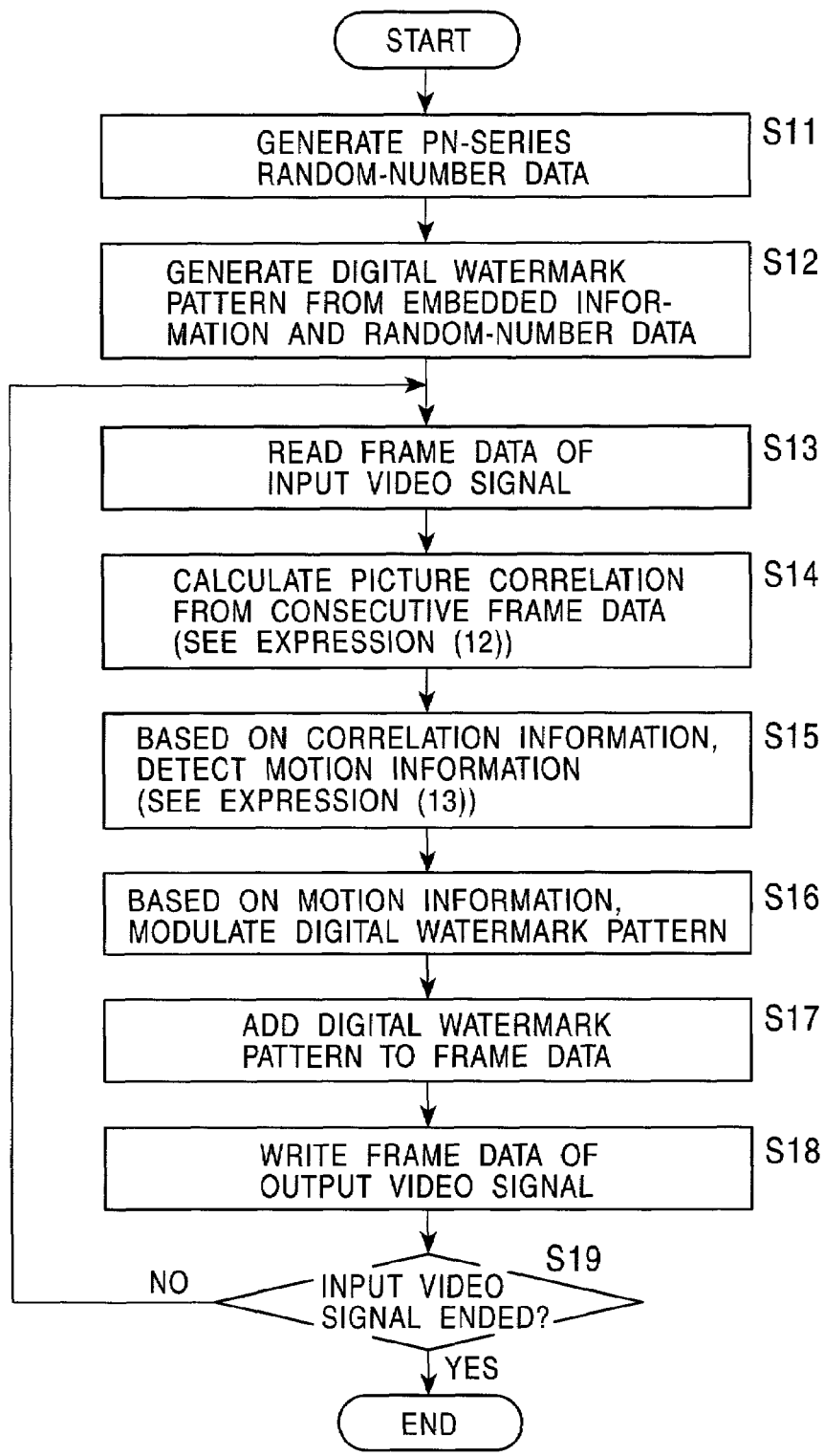
FIG. 5 is a flowchart showing an example of a process by the digital watermark embedding device of the present invention.

Next, a process performed in a digital watermark embedding device of the present invention is described below with reference to the flowchart shown in FIG. 5. FIG. 5 shows a process of the digital watermark embedding device that performs motion detection for an input signal such as an input digital video signal, modulates a digital watermark pattern in accordance with motion information, and embeds the modulated digital watermark pattern in the input signal. Steps constituting the process are described below.

In step S11, the digital watermark embedding device generates PN-series random-number data PN. In step S12, in accordance with the input signal as a signal in which digital watermark information is embedded, the digital watermark embedding device uses a spread spectrum method to process, by using the random-number data PN, embedding information (copy control information) representing one of "Copy Free" information, "Copy Once" information, and "Never Copy" information, whereby a digital watermark pattern WN1 is generated.

In step S13, the digital watermark embedding device sequentially reads the input digital video signal DV1 in units of frame data. In step S14, the digital watermark embedding device outputs correlation information M by calculating picture correlation for the temporally sequential input digital video signal DV1. In step S15, based on the correlation information M, the digital watermark embedding device detects a motion of the picture and outputs motion information V. Specifically, after generating a delayed digital video signal DV1' obtained by storing the input digital video signal DV1 in units of frames and delaying the stored signal for a frame, by using expression (12), based on two temporally sequential digital video signals DV1 and D1', a frame-correlation plane in a motion vector search range $(V_x, V_y)$ is calculated, and a motion vector $(V_x, V_y)$ that gives maximum correlation is determined by using expression (13) and is output as motion information V.

In step S16, in the digital watermark embedding device, a digital watermark pattern WM2 in which human visual characteristics are considered is generated by modulating the digital watermark pattern WM1 based on the motion information V and is output. Specifically, based on the detected motion information V, when the input digital video signal DV1 represents a stationary state, the digital watermark pattern WM1 is also controlled to be stationary, and when the input digital video signal DV1 represents a moving state, the digital watermark pattern WM1 is also moved to follow the motion, whereby the digital watermark pattern WM2 is generated and output.

The digital watermark pattern WM2 generated by modulation is stationary when the input picture is stationary, while when the input picture is moving, the digital watermark pattern WM2 is moved to follow the motion, so that it is difficult for the digital watermark pattern WM2 to be perceived by the human eye. This can effectively prevent the digital watermark information from affecting the picture quality, without changing the intensity for the entire picture of embedding the digital watermark information.

Proceeding to step S17, the digital watermark embedding device adds the digital watermark pattern WM2 to the input signal. In step S18, a signal in which digital watermark information is embedded is output in a form identical to that of the input signal by the digital watermark embedding device.

In step S19, the digital watermark embedding device determines whether it has completed processing of the input signal. If the result of the determination is negative, the digital watermark embedding device returns to step S13 and repeatedly executes the following steps. If the result of the determination is affirmative, the digital watermark embedding device terminates the process.

A specific example of the motion detection by the digital watermark embedding device is described below with reference to FIGS. 6A to 6E. FIGS. 6A to 6E show a case in which a picture signal represents horizontal shifting. Human visual characteristics tend to follow a moving object. When a digital watermark pattern is superimposed on a picture signal representing some motion, if a stationary digital watermark pattern exists in a moving picture as a background, the digital watermark pattern can be easily perceived, thus causing large deterioration in picture quality. Accordingly, as described above, the digital watermark pattern is moved similarly to the moving picture.

When there are the picture frames shown in FIGS. 6A and 6B as temporally sequential picture signals, by using the above matching-value calculating expression (expression (12)) for both picture frames, a matching value is calculated, and by using the above vector calculating expression (expression (13)), a motion vector is calculated.

In this case, as FIG. 6C shows, a motion vector $(V_x, 0)$ in the horizontal (X) direction is calculated. By generating the digital watermark pattern shown in FIG. 6E by modulating the digital watermark pattern shown in FIG. 6D so that it is moved by the horizontal motion vector $(V_x, 0)$ in accordance with the detected information V=(V$_x$, 0), the digital watermark pattern can be controlled to follow a motion of the picture signal.

In this technique, based on motion information detected from temporally sequential picture signals, when the picture signals represent a stationary state, the digital watermark pattern is also controlled to be stationary, and when the picture signals represent a moving state, the digital watermark pattern is moved to follow the motion information. This enables embedding of digital watermark information so that it cannot be perceived by the human eye.

The process of modulating the digital watermark pattern so that it can similarly move to match a motion of a picture is one of techniques that prevent digital watermark information from being perceived by the human eye. For example, a digital watermark embedding process may be executed such that the stationary or moving information of a picture signal is detected by acquiring the above motion vector, and when it is determined based on the motion vector that the picture signal represents a stationary state, the digital watermark pattern is also controlled to be stationary, while when it is determined based on the motion vector that the picture signal represents a moving state, the digital watermark pattern is modulated so as to be randomly moved. In this case, the motion vector of the picture signal and the motion vector of the digital watermark pattern differ from each other. However, it is difficult for the randomly moving digital watermark pattern in the moving picture to be perceived, so that the digital watermark pattern can be prevented from affecting the picture quality.

Second Example of Digital Watermark Embedding Device

In the above digital watermark embedding device, based on motion information detected from a picture signal by using frame correlation of the picture signal, when the picture signal represents a stationary state, a digital watermark pattern is also controlled to be stationary, and when the picture signal represents a moving state, the digital watermark pattern is moved to follow the motion or is randomly moved. Next, a construction is described below that, based on motion information detected from a picture signal, by executing various processes of modulating a digital watermark pattern, which are different from that by the above device, executes embedding of digital watermark information that cannot be perceived by the human eye.

Figure 7A:
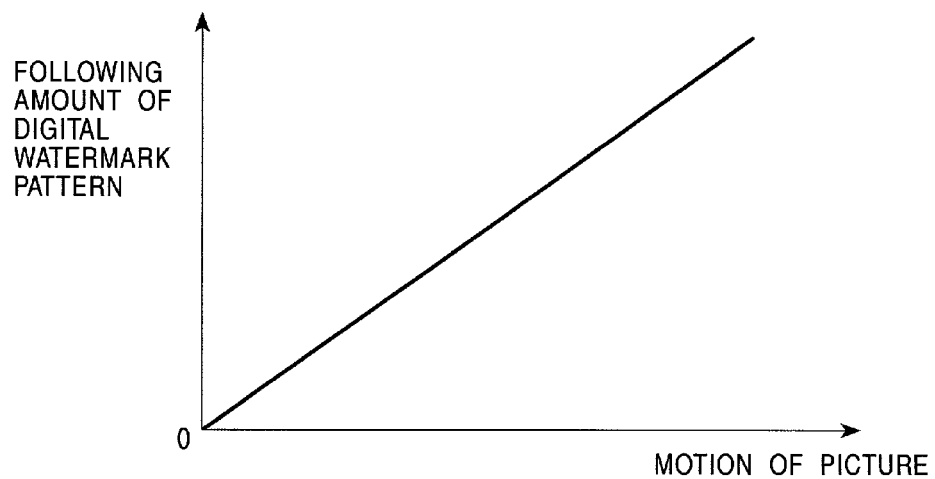
FIGS. 7A and 7B are graphs showing a process of moving a digital watermark pattern to follow a picture motion in the digital watermark embedding device of the present invention.
Figure 7B:
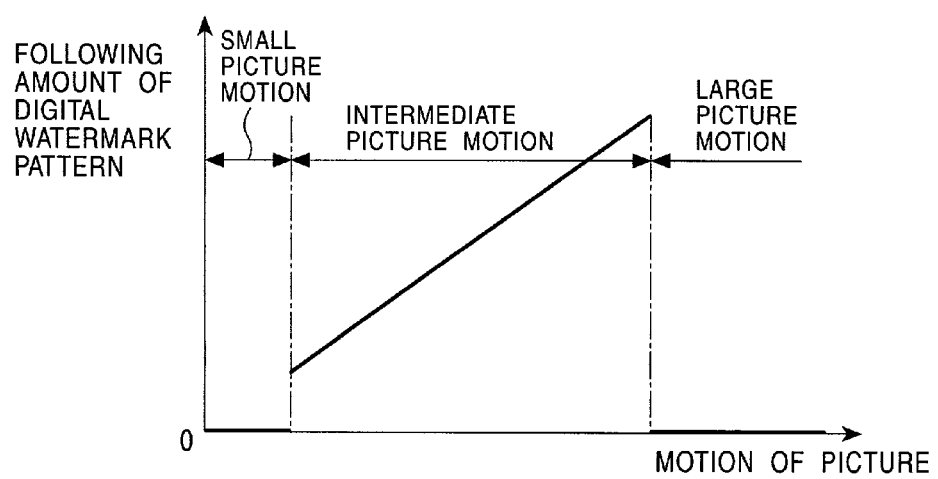

FIGS. 7A and 7B illustrate a motion between temporally sequential picture signals, and a motion of a digital watermark pattern moved to follow the picture signal motion, respectively. The picture signal motion means the magnitude of a motion vector obtained by finding a matching value based on expression (12), and performing expression (13) using the matching value. Based on a motion vector detected from temporally sequential picture signals, that is, motion information, when the picture signals represent a stationary state, a digital watermark pattern is also controlled to be stationary, and when the picture signals represent a moving state, and the digital watermark pattern is also moved to follow the motion, the digital watermark pattern may be controlled to be superimposed on the picture signal so that the picture signal motion and the amount of following the motion by the digital watermark pattern can exhibit the relationship shown in FIG. 7A. This corresponds to the above-described processing in the above first example of the digital watermark embedding device.

By way of example, a case in which a stationary digital watermark pattern is superimposed on a picture signal of pictures moving at various speeds is considered. When a picture that is obtained by embedding the stationary digital watermark pattern in the pictures moving at various speeds is observed, human visual characteristics depend on a motion speed represented by the picture signal, that is, the magnitude of a motion vector detected from temporally sequential picture signals.

When the picture signal represents a still picture or a very slightly moving picture, both the picture represented by the picture signal and the digital watermark pattern visually look stationary, so that it is difficult to perceive picture deterioration. Conversely, when the picture signal represents a greatly moving picture, human eyes should follow the motion represented by the picture signal. Also in this case, it is difficult to perceive picture deterioration because the stationary digital watermark pattern cannot be perceived by the human eye.

As described above, in a case in which the picture signal represents a still picture or a very slightly moving picture, or in which the picture signal represents a greatly moving picture, if a stationary digital watermark pattern is embedded, it is difficult for the digital watermark pattern to be perceived, and picture deterioration caused by the digital watermark pattern cannot be perceived. However, when the motion represented by the picture signal is intermediate between the motion levels, a state occurs. In this state, human eyes can easily perceive the stationary digital watermark pattern while following the motion represented by the picture signal. In this case, while the slowly moving picture is being observed, the stationary digital watermark pattern also comes into view, so that picture quality deterioration caused by the digital watermark pattern can be easily perceived.

A construction that implements a process of embedding a digital watermark pattern in response to a motion represented by the picture signal in a form in which the digital watermark pattern cannot be viewed is described below.

In a digital watermark embedding device based on the above construction, from temporally sequential picture signals, motion information is detected, specifically, a matching value is found based on expression (12). Based on the magnitude of motion vector found based on expression (13) from the found matching value, when a picture signal represents a still or slightly moving picture, or a very greatly moving picture, embedding of a stationary digital watermark pattern is executed, and when the picture signal represents the magnitude of a motion vector and a picture moving at an intermediate speed between the speeds of the above two pictures, embedding of a digital watermark pattern controlled to move similarly to the motion vector is executed.

By employing this construction, only in a case in which the picture signal represents a picture moving at a speed for enabling human eyes to perceive a stationary digital watermark pattern, a process of moving the digital watermark pattern to follow the motion may be executed. This can reduce the amount of arithmetic processing required for executing the process of moving the digital watermark pattern. Also, when the picture signal represents a still or slightly moving picture, or a very greatly moving picture, a process of embedding a stationary digital watermark pattern is performed. This can reduce a rate of occurrence of positional shifting caused by moving the digital watermark pattern, and can prevent precision of digital watermark pattern detection from decreasing.

FIG. 7B shows a motion of the picture represented by the picture signal in the digital watermark embedding device according to this embodiment and a following amount of the digital watermark pattern which is moved to follow the motion.

As FIG. 7B shows, when the picture signal represents a still picture, or the motion of the picture represented by the picture signal is very small, and when the motion of the picture represented by the picture signal is very large, the stationary digital watermark pattern cannot be visually perceived. Thus, by controlling the digital watermark pattern to be stationary, the digital watermark pattern is superimposed on the picture represented by the picture signal. Also, when the motion of the picture represented by the picture signal is at an intermediate level between the above two pictures, the stationary digital watermark pattern is in such a range that it can be visually perceived. Thus, by controlling the digital watermark pattern so that the motion of the picture represented by the picture signal and the following amount of the digital watermark pattern are, for example, proportional to each other, the digital watermark pattern is superimposed on the picture represented by the picture signal. This enables superimposition of a digital watermark pattern so that it can follow a motion represented by a picture signal after it is effectively modulated in consideration of human visual characteristics.

The structure of the digital watermark embedding device is described below in which, when the picture signal represents a still picture, or the motion of the picture represented by the picture signal is very small, and when the motion of the picture represented by the picture signal is very large, the digital watermark pattern is controlled to be stationary for superimposition, while, when the motion of the picture represented by the picture signal is intermediate between the above two pictures, the digital watermark pattern is superimposed on the picture represented by the picture signal by controlling the digital watermark pattern so that the motion of the picture represented by the picture signal and the following amount of the digital watermark pattern are proportional to each other.

Also in the digital watermark embedding device according to the embodiment, the construction that finds a matching value based on expression (12) and finds the motion of the picture represented by the picture signal based on expression (13) from the matching value can be used. Accordingly, the basic structure is similar to the digital watermark embedding device 100 shown in FIG. 3. The digital watermark embedding device according to this embodiment is implemented by changing the structure of the signal modulator 124 of the digital watermark embedding device 100 in FIG. 3.

Figure 8:
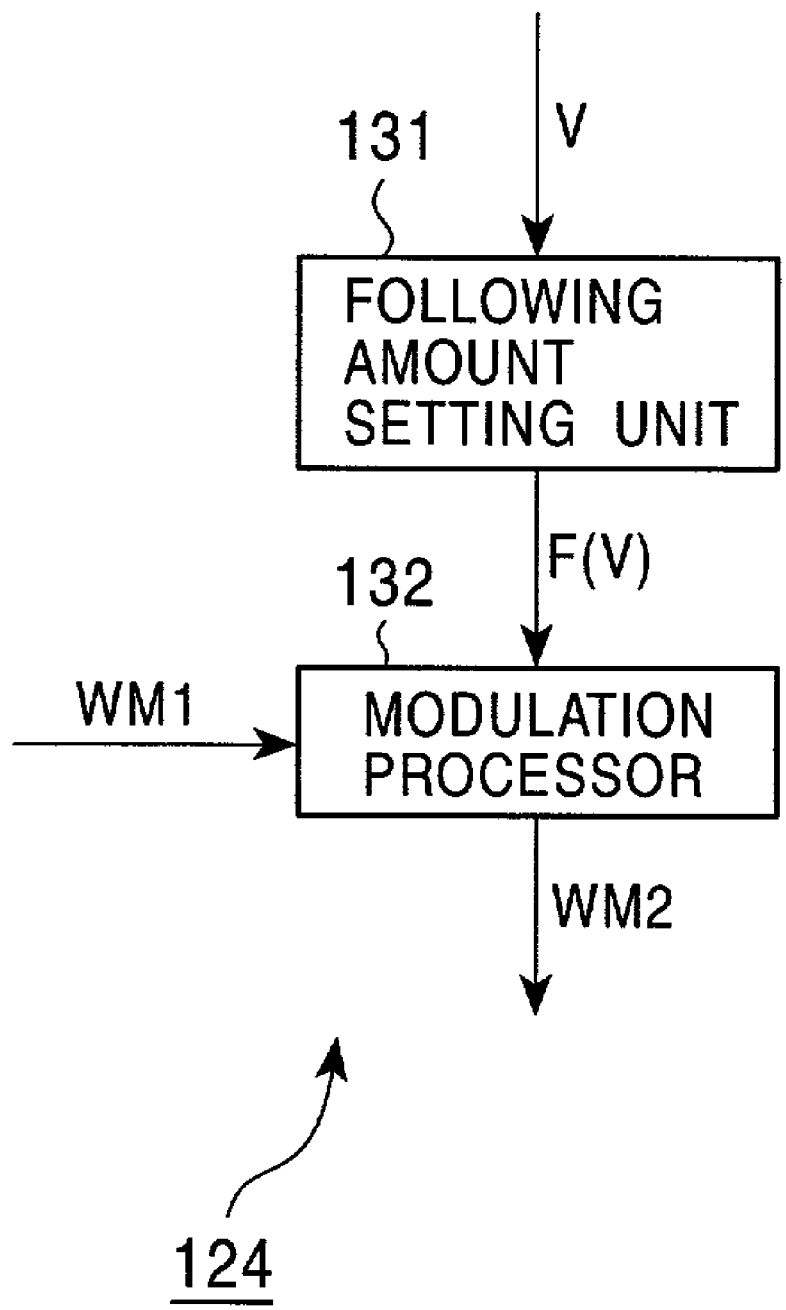
FIG. 8 is a block diagram showing the signal modulator of the digital watermark embedding device of the present invention.

FIG. 8 shows the structure of a signal modulator 124 in the digital watermark embedding device according to this embodiment. The signal modulator 124 receives motion information V from the motion detector 123, the digital watermark pattern WM1 from the multiplier 122. The signal modulator 124 also outputs the digital watermark pattern WM2 to the adder 125 after executing a process of modulating the digital watermark pattern WM1. Here, motion information V corresponds to the motion vector obtained by performing calculation based on expression (13) from a matching value that is found based on expression (12) by the motion detector 123.

A following-amount setting unit 131 in the signal modulator 124 receives motion information V from the motion detector 123, and determines a following amount of the digital watermark pattern based on the received motion information V. The following-amount setting unit 131 has an arithmetic function that outputs following-amount information F(V) of the digital watermark pattern by using, as inputs, the motion shown in FIG. 7B of the picture represented by the picture signal, data for correlating the following motion of the digital watermark pattern, or the motion of the picture represented by the picture signal, that is, motion information V.

Specifically, the following-amount setting unit 131 sets the magnitude |F(V)| of the following amount of the digital watermark pattern in accordance with the magnitude |V| of the motion vector, as described below, and outputs the set magnitude to a modulation processor 132.

$$0 \leq |V| < a \rightarrow |F(V)| = 0$$

$$a \leq |V| \leq b \rightarrow |F(V)| = a - b(|F(V)| = V)$$

$$b < |V| \rightarrow |F(V)| = 0 \tag{14}$$

In expression (14), a and b are values set so as to correspond to the magnitude (speed) of the motion vector, and have the relationship represented by 0<a<b. The following-amount setting unit 131 sets the following-amount information F(V) in accordance with motion information V from the motion detector 123, as described above, and outputs the set information to the modulation processor 132. In accordance with the following-amount information F(V), the modulation processor 132 executes modulation of the digital watermark pattern WM1, and outputs the digital watermark pattern WM2 to the adder 125.

For example, when the magnitude of the motion vector input from the motion detector 123 is $0 \leq |V| < a$, or $b < |V|$, $|F(V)|=0$, that is, F(V)=(0, 0) is output to the modulation processor 132 by the following-amount setting unit 131. The modulation processor 132 generates the digital watermark pattern WM2 by executing a modulating process in which the digital watermark pattern WM1 is also made stationary in accordance with following-amount information F(V)=(0, 0).

When the magnitude (speed) of the motion vector input from the motion detector 123 is $a \leq |V| \leq b$, the following-amount setting unit 131 generates the digital watermark pattern WM2 by, in accordance with |F(V)|=a-b=V, that is, $F(V)=V(V_x, V_y)$ similarly to the motion vector V input from the motion detector 123, executing a process of modulating the digital watermark pattern WM1 so that it is moved to follow the picture. The following-amount setting unit 131 outputs the generated digital watermark pattern WM2 to the adder 125.

By employing the above processing, when the picture signal represents a still picture, or the motion of the picture represented by the picture signal is very small, and when the motion of the picture represented by the picture signal is very large, the digital watermark pattern can be superimposed on the picture represented by the picture signal while being controlled to be stationary. When the motion of the picture represented by the picture signal is at an intermediate level between the above two pictures, the digital watermark pattern can be embedded in the picture represented by the picture signal so that the motion of the picture represented by the picture signal and the following amount of the digital watermark pattern are proportional to each other. Thus, the digital watermark pattern can be embedded so that visual detection thereof is difficult.

Digital Watermark Embedding Process

Figure 9:
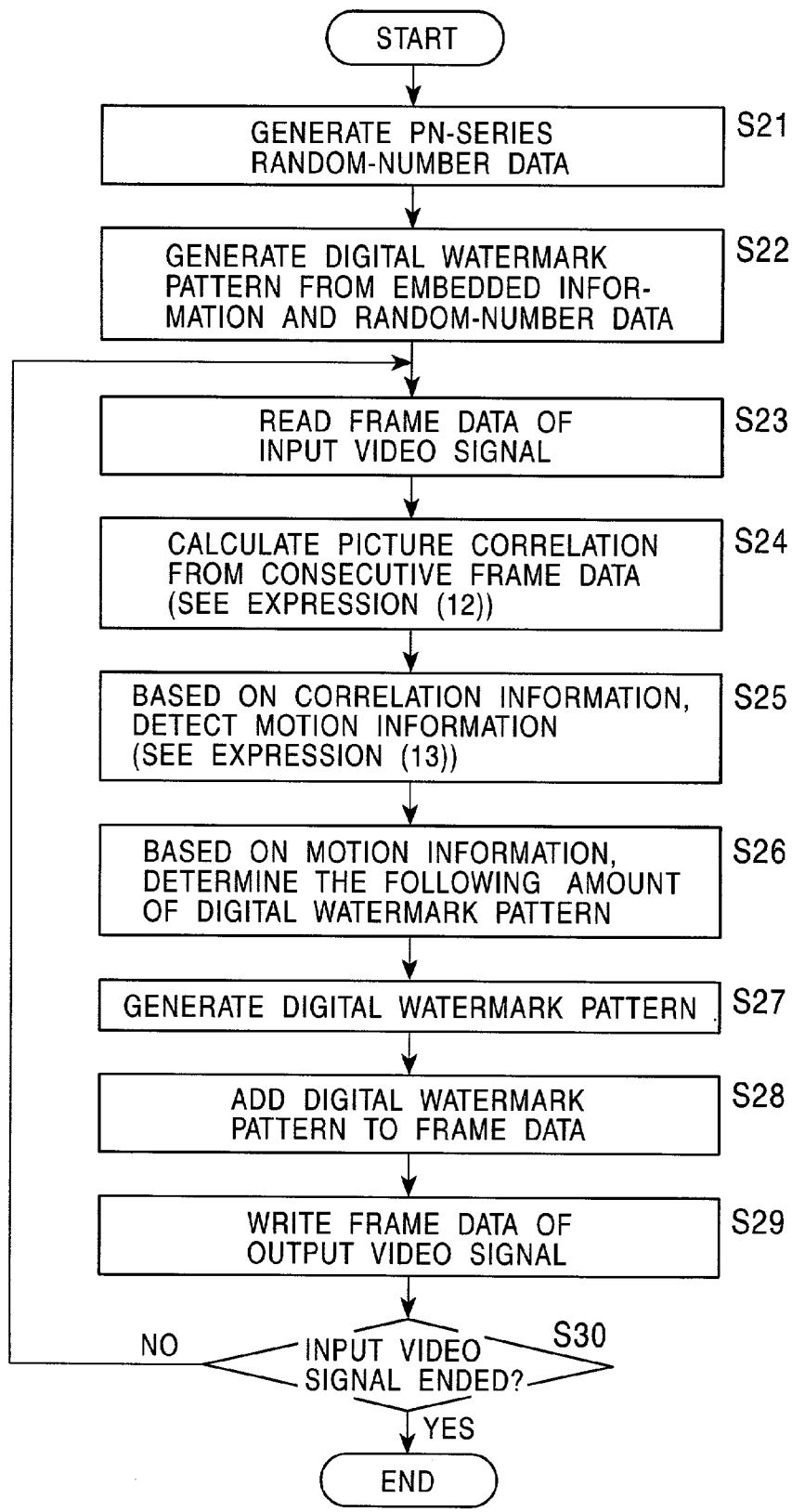
FIG. 9 is a flowchart showing a process of the digital watermark embedding device of the present invention.

Next, the flowchart shown in FIG. 9 is used to describe the process of the digital watermark embedding device in which, when the picture signal represents a still picture, or the motion of the picture represented by the picture signal is very small, and when the motion of the picture represented by the picture signal is very large, the digital watermark pattern is controlled to be stationary for superimposition, while, when the motion of the picture represented by the picture signal is intermediate between the above two pictures, the digital watermark pattern is superimposed on the picture represented by the picture signal by controlling the digital watermark pattern so that the motion of the picture represented by the picture signal and the following amount of the digital watermark pattern are proportional to each other. Steps S21 to S25 are not described since they are identical to steps S11 to S15 shown in FIG. 5.

In step S26, the digital watermark embedding device determines the following amount of the digital watermark pattern based on motion information V. Specifically, when the magnitude of the input motion vector is $0 \leq |V| < a$, or $b < |V|$, a following amount in which $|F(V)|=0$ is set. When the magnitude (speed) of the input motion vector is $a \leq |V| \leq b$, a following amount in which $|F(V)|=a-b=V$ is set.

In step S27, by performing modulation based on the following-amount information F(V) of the digital watermark pattern WM1, the digital watermark embedding device generates and outputs the digital watermark pattern WM2 in which human visual characteristics are considered. Specifically, when following-amount information F(V)=0 is input, the digital watermark embedding device executes the process of modulating the digital watermark pattern WM1 so that it is also controlled to be stationary, while, when following-amount information $F(V)=V(V_x, V_y)$, which a magnitude being not zero, is input, the digital watermark embedding device executes the process of modulating the digital watermark pattern WM1 so that it is moved to follow the picture in response to the following-amount information $F(V)=V(V_x, V_y)$, whereby the digital watermark pattern WM2 is generated and output to the adder 125.

In other words, based on the detected motion information V, the following amount of the digital watermark pattern is determined. When the input digital video signal DV1 represents a still or slightly moving picture, or a very greatly moving picture, the digital watermark pattern is controlled to be stationary. When the motion of the picture represented by the picture signal is intermediate between the above two pictures, the digital watermark pattern is modulated so that it is moved to follow the motion of the picture, whereby the digital watermark pattern WM2 is generated.

In step S28, the digital watermark embedding device adds the digital watermark pattern WM2 obtained by the modulation to the input signal. In step S29, a signal in which the digital watermark information is embedded is output in a form identical to that of the input signal by the digital watermark embedding device.

In step S30, the digital watermark embedding device determines whether it has completed input signal processing. If the result of the determination is negative, the digital watermark embedding device returns to step S23 and repeatedly executes the subsequent steps. If the result of the determination is affirmative, the digital watermark embedding device terminates its processing.

In this embodiment, a motion vector is calculated from an input picture, and based on the calculated motion vector, an amount of moving a digital watermark pattern to follow a motion. This enables a digital watermark pattern to be modulated so as to be moved to follow a motion in accordance with human visual characteristics, so that the digital watermark pattern can be embedded so as not to be viewed.

Third Example of Digital Watermark Embedding Device

Next, a construction that, by changing a digital watermark embedding intensity based on motion information detected from a picture signal, executes embedding of a digital watermark pattern so that it cannot be visually perceived is described below.

Figure 10A:
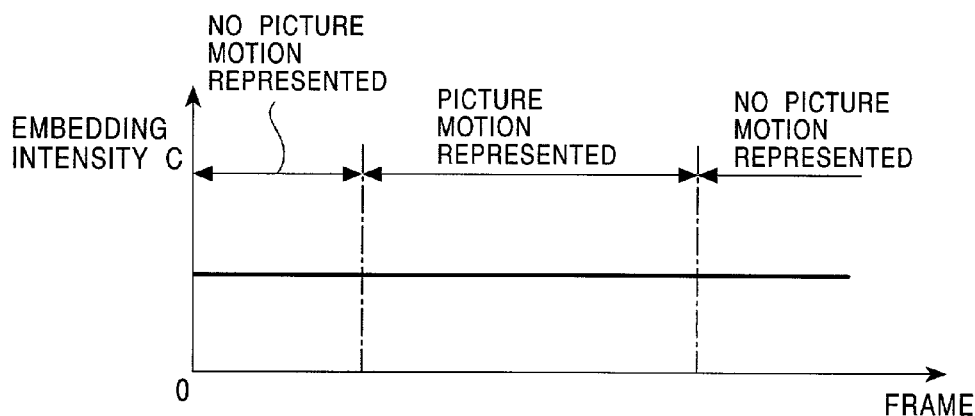
FIGS. 10A, 10B, and 10C are graphs illustrating adjustment of digital watermark intensity in accordance with a picture motion in the digital watermark embedding device shown in the present invention.
Figure 10B:
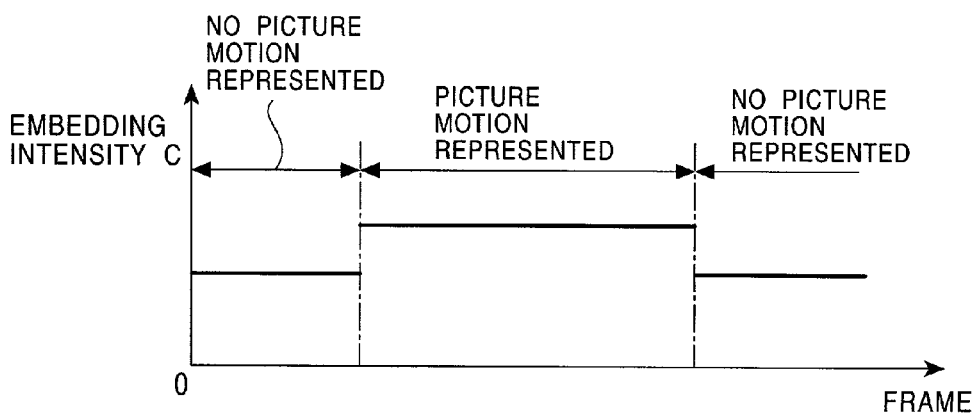
Figure 10C:
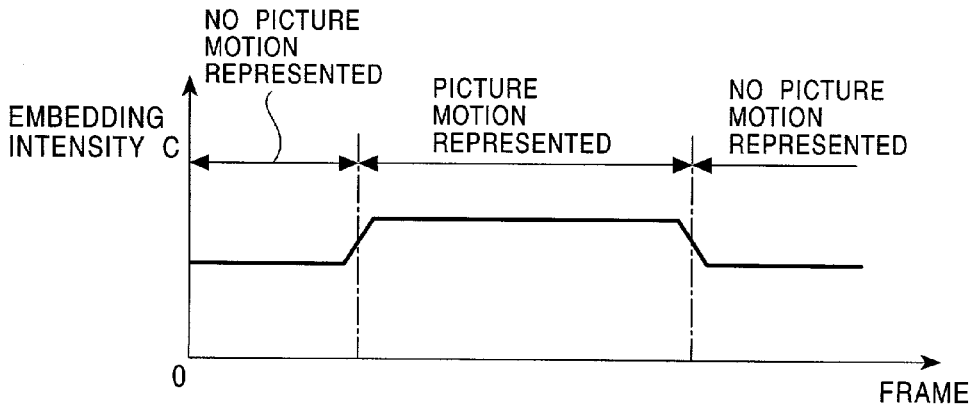

FIGS. 10A to 10C illustrate a process of adjusting an embedding intensity used when a digital watermark pattern is superimposed on a picture represented by temporally sequential picture signals. The embedding intensity is a value corresponding to nonnegative scalar value C indicated in expression (10). As described above, to increase reliability of digital watermark detection, a process that uses nonnegative scalar value C to increase the digital watermark embedding intensity is executed. Frame data DV2 of the brightness signal, obtained when digital watermark embedding is performed using a digital watermark embedding intensity increased with scalar value C, is expressed by DV2=DV1+CWM.

A picture signal is considered which temporally changes, based on motion information detected from temporally sequential picture signals, in such a way that, for example, no picture motion is represented in frames 0 to n, a picture motion is represented in frames n to m, and no picture motion is represented in frames m and thereafter. The motion represented by the picture signal is found based on the magnitude of a motion vector found based on expression (13) from a matching value found based on expression (12).

When the digital watermark embedding intensity is not change, as FIG. 10A shows, in each of frames 0 to n, n to m, and m and thereafter, a digital watermark pattern is embedded with a constant digital watermark embedding intensity. To increase the reliability of digital watermark detection, it is expected that digital watermark patterns are embedded with a higher embedding intensity. However, the higher-embedding-intensity digital watermark pattern has problems in that it can be easily viewed and in that it causes deterioration in picture quality. Also, when a picture moves, it is difficult to perceive a digital watermark pattern for the picture. When a picture is stationary, a digital watermark pattern for the picture can be easily perceived. Accordingly, a digital watermark embedding device according to this embodiment of the present invention is designed so that, when a picture moves, the devices increases a digital watermark embedding intensity, and when a picture is stationary, the device reduces the digital watermark embedding intensity.

As FIG. 10B shows, an embedding intensity in a frame having a motion is increased than that in a frame having no motion, and a digital watermark pattern is embedded. At this time, it is preferable to perform a process of moving the digital watermark pattern to follow a motion represented by a picture signal. This construction enables a digital watermark pattern to be embedded so as not to be visually perceived, and can increase the reliability of detection in digital watermark detecting processing.

A rapid change in the digital watermark embedding intensity between a frame having no picture motion and a frame having a picture motion causes a possibility that a change in the digital watermark embedding intensity can be easily perceived in an interframe portion. In a picture signal representing a change from a motion frame to a motionless frame, the embedding intensity and motion of a digital watermark pattern embedded so as to follow a motion represented by the picture signal may rapidly change, thus increasing a change (deterioration) in picture.

In this case, as shown in, for example, FIG. 10C, by employing a construction that executes a process of smoothly changing the digital watermark embedding intensity in a boundary between the motion frame and the motionless frame, it is possible to effectively suppress picture quality deterioration due to the change in the embedding intensity in the frame boundary.

The structure of the digital watermark embedding device for implementing a digital watermark pattern in the most difficult form for visual perception in accordance with a motion transition between frames of a picture signal is described below. The above digital watermark embedding device finds a matching value based on motion information detected from temporally sequential picture signals, specifically, expression (12), finds motion information on the picture signal based on the magnitude of motion vector found based on expression (13) from the matching value, and executes embedding of a digital watermark pattern the embedding intensity of which is adjusted based on the motion information. Accordingly, the basic structure is similar to the digital watermark embedding device 100 shown in FIG. 3. The digital watermark embedding device according to this embodiment is implemented by changing the structure of the signal modulator 124 of the digital watermark embedding device 100 in FIG. 3.

Figure 11:
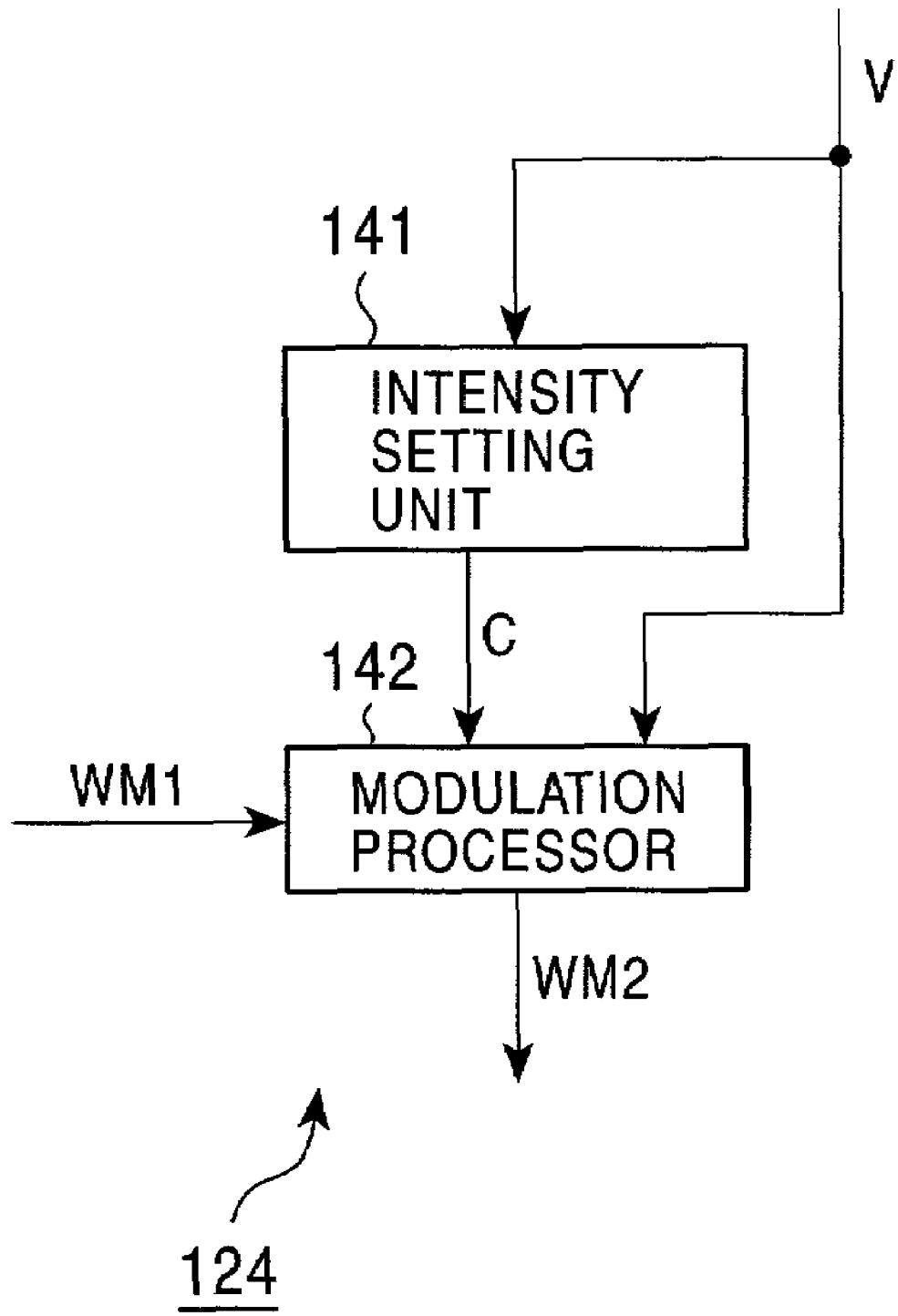
FIG. 11 is a block diagram showing the signal modulator of the digital watermark embedding device of the present invention.

FIG. 11 shows the structure of a signal modulator 124 in the digital watermark embedding device according to this embodiment. The signal modulator 124 receives motion information V from the motion detector 123, and receives a digital watermark pattern WM1 from the multiplier 122. By executing a process of modulating the digital watermark pattern WM1, the signal modulator 124 generates and outputs a digital watermark pattern WM2 to the adder 125. The moment information V corresponds to a motion vector found based on expression (13) from a matching value found based on expression (12) by the motion detector 123.

An intensity setting unit 141 in the signal modulator 124 receives the motion information V from the motion detector 123, and determines, based on the motion information V, an embedding intensity for a digital watermark pattern to be embedded. The intensity setting unit 141 has an arithmetic function that uses, as inputs, the motion represented by the picture signal in FIG. 10B or FIG. 10C, and correlation data on embedding intensity C for digital watermark pattern, or the motion represented by the picture signal, that is, the motion vector V, and outputs embedding intensity C on the digital watermark pattern.

Specifically, the digital-watermark-pattern embedding intensity C is set as shown below in accordance with the motion information V from the motion detector 123, that is, the magnitude |V| of the motion vector, and is output to a modulation processor 142 by the intensity setting unit 141.

$$|V|=0 \rightarrow C=C1$$

$$|V| \neq 0 \rightarrow C=C2 \quad (15)$$

where C1 and C2 are digital-watermark-embedding-intensity scalar values that are set so as to correspond to the magnitude (speed) of the motion vector, and C1 and C2 have the relationship represented by C1<C2.

In accordance with the motion information V from the motion detector 123, the intensity setting unit 141 sets the embedding intensity C, as described above, and outputs the set embedding intensity C to the modulation processor 142. By executing modulation of the digital watermark pattern WM1 in accordance with the embedding intensities C1 and C2 set by the intensity setting unit 141, the modulation processor 142 generates and outputs a digital watermark pattern WM2 to the adder 125.

The modulation processor 142 may be designed to perform a modulating process that, by referring to the motion information V input from the motion detector 123, that is, the motion vector, generates a digital watermark pattern that follows a picture motion similarly to the digital watermark embedding device 1.

In other words, when the input digital video signal DV1 represents a still picture, the modulation processor 142 modulates the digital watermark pattern WM1 as a pattern made stationary in accordance with the motion information V=(0, 0) output from the motion detector 123, and generates a digital watermark pattern WM2 by executing intensity modulation based on scalar value C1. When the input digital video signal DV1 represents a picture moved by a motion vector ($V_x$, $V_y$), by executing a modulating process that moves the digital watermark pattern WM 1 to follow the motion vector ($V_x$, $V_y$) output from the motion detector 123, and by executing intensity modulation based on scalar value C2, the modulation processor 142 generates a digital watermark pattern WM2.

This enables weak embedding in a still picture of a stationary digital watermark pattern, and strong embedding in a moving picture of a digital watermark pattern that follows a motion, so that a digital watermark pattern can be embedded so as not be visually perceived.

Although the above case uses two types of intensity setting values, C1 and C2, more intensity setting values may be used in accordance with the value of a motion vector of the picture, such as C1, C2, C3, etc., in accordance with the picture motion.

As described above using FIG. 10C, a construction that executes a process of smoothly changing the embedding intensity in a boundary between a motion frame and a motionless frame may be employed. Specifically, setting-modulating processing is executed which gradually increasing the embedding intensity in a plurality of frames near a transition boundary from a still picture frame to a moving picture frame and which gradually reduces the embedding intensity in a plurality of frames near a transition boundary from a moving picture frame to a still picture frame. In this construction, before the signal modulator 124 executes the digital-watermark-pattern modulating process, motion detection from each precedent picture frame is executed, motion vector data from the precedent picture frame is stored in a memory, and based on the stored motion information on the precedent picture frame, the intensity C in each frame is output to the modulation processor 142 by the intensity setting unit 141.

Digital Watermark Embedding Process

Figure 12:
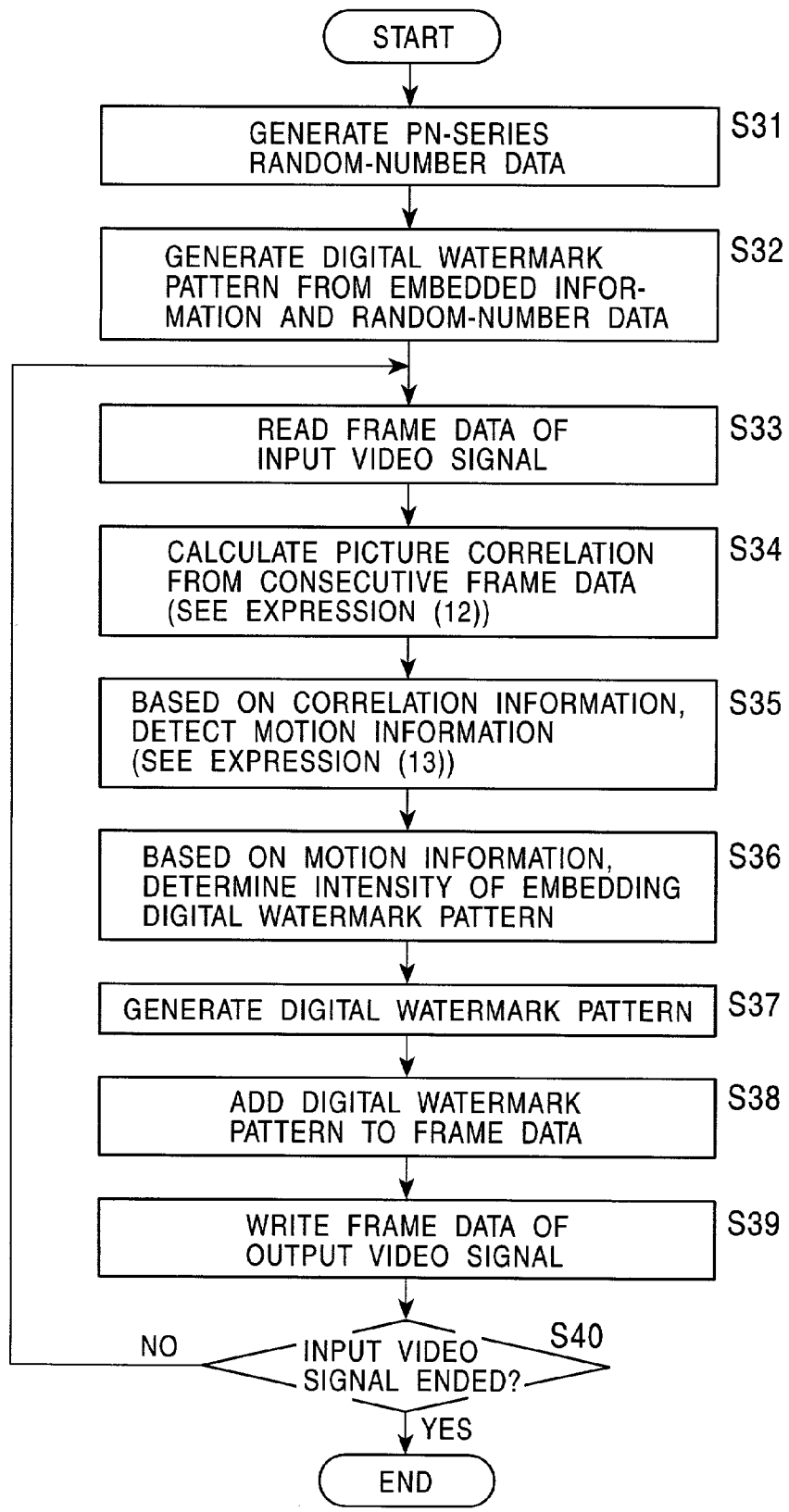
FIG. 12 is a flowchart illustrating a process of the digital watermark embedding device of the present invention.

Next, the process by the digital watermark embedding device of executing the above intensity-modulating process is described below with reference to the flowchart shown in FIG. 12. FIG. 12 is a flowchart showing a process by a digital watermark embedding device of performing motion detection on an input signal such as a digital video signal, and executing a digital watermark embedding process that uses digital-watermark-pattern embedding-intensity changing in accordance with motion information. The steps of the process are described below.

A description of steps S31 to S35 shown in FIG. 12 is omitted since they are identical to steps S11 to S15 shown in FIG. 5.

In step S36, the digital watermark embedding device determines the embedding intensity based on the motion vector V. Specifically, when the magnitude of the input motion vector is, for example, zero, an embedding intensity in which C=C1 is set. When the magnitude of the input motion vector is not zero, an embedding intensity in which C=C2 is set.

In step S37, by modulating the digital watermark pattern WM1, based on the set intensity and the motion information, the digital watermark embedding device generates and outputs a digital watermark pattern WM2 in which human visual characteristics are considered. Specifically, when the intensity setting unit's output is C1, the modulation processor 132 performs intensity modulation represented by C1WM1, and when the intensity setting unit's output is C2, modulation processor 132 performs intensity modulation represented by C2WM1. Also, in accordance with the motion information V output from the motion detector 123, by executing a modulating process that controls the digital watermark pattern WM1 to be stationary or to follow a motion, the digital watermark pattern WM2 is generated.

In step S38, the digital watermark embedding device adds the digital watermark pattern WM2 obtained by the modulation to the picture represented by the input signal. In step S39, a signal in which the digital watermark information is embedded is output in a form identical to that of the input signal by the digital watermark embedding device.

In step S40, the digital watermark embedding device determines whether it has completed the processing of the input signal. If the result of the determination is negative, the digital watermark embedding device returns to step S33 and repeatedly performs the subsequent steps. By sequentially repeating similar processing on the input signal, the digital watermark embedding device processes the input signal, and if the result of the determination in step S40 is affirmative, the digital watermark embedding device terminates the processing.

In this embodiment, a motion vector is calculated from an input picture, and a digital-watermark-embedding intensity is set based on the calculated motion vector. This enables intensity modulation of digital watermark pattern in accordance with human visual characteristics, so that a digital watermark pattern can be embedded so as not to be visually perceived.

Digital Watermark Detecting Device

Figure 13:
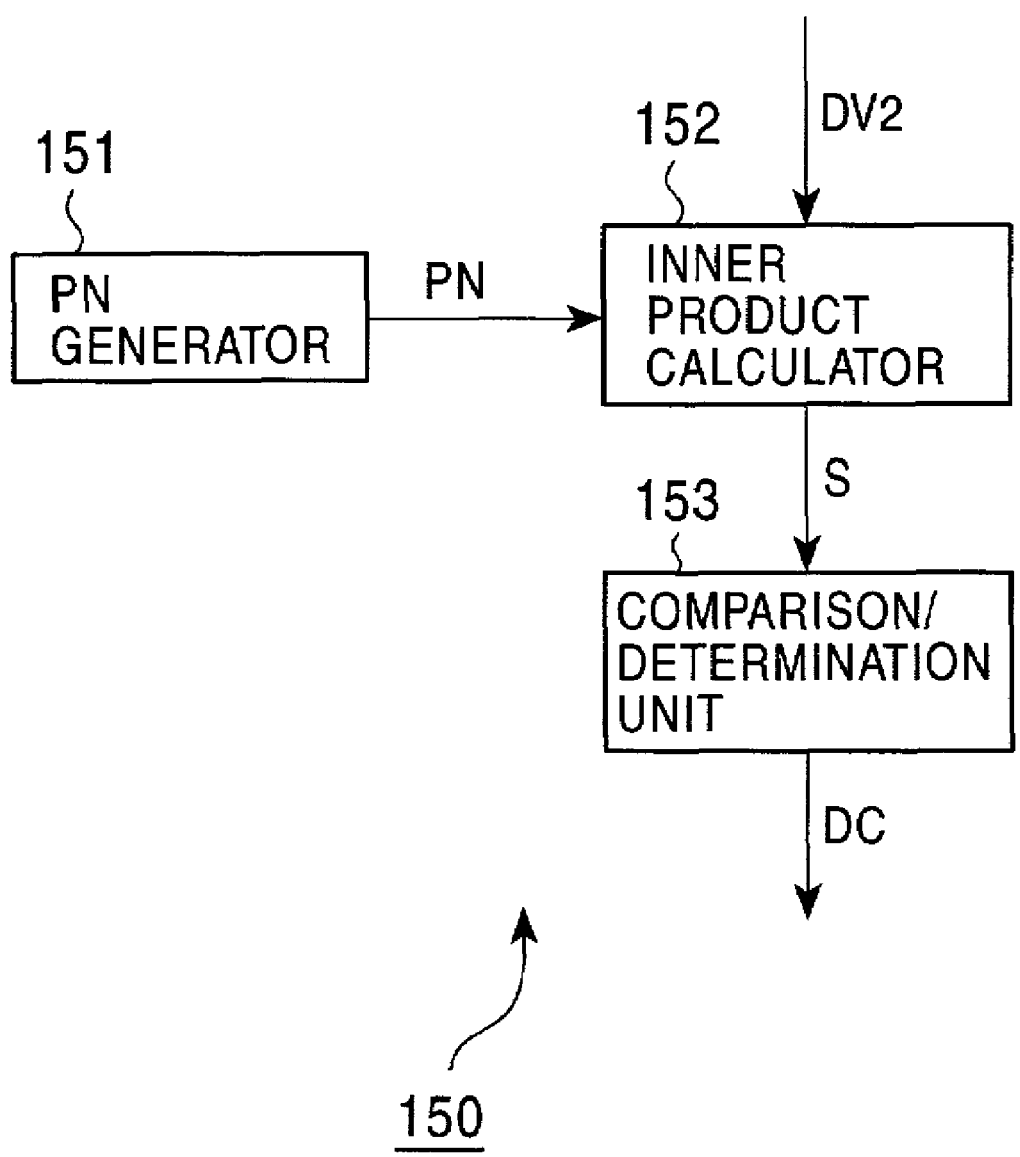
FIG. 13 is a block diagram showing a digital watermark detecting device of the present invention.

Next, the structure of a digital watermark detecting device is described below with reference to FIG. 13. The digital watermark detecting device 150 shown in FIG. 13 detects embedded digital watermark information DC from a digital video signal DV2 received via a medium such as satellite or terrestrial waves from a broadcasting station, or a cable, or from a digital video signal DV2 obtained by playing back an optical disk or the like.

In the digital watermark detecting device 150, a PN generator 151 generates PN-series random-number data PN, and performs watermark detection by using the random-number data PN as a basic pattern. By generating the PN-series random-number data PN, which is identical to that generated by the PN generator 121 or 141 in the digital watermark embedding device 100, the PN generator 151 performs correct detection of the digital watermark information DC that is embedded by the spread spectrum method so as not to be analyzed.

In the digital watermark detecting device 150, the inner product S of the digital video signal DV, which is sequentially input, and the random-number data PN is calculated and output by an inner product calculator 152. By comparing the inner product S with an appropriately set threshold value, a comparison/determination unit 153 determines whether the digital watermark information DC is embedded, and determines, if the digital watermark information DC is embedded, the polarity of the embedded digital watermark information DC. Specifically, based on a nonnegative threshold value TH, the determination is made as follows:

When $S \leq -TH$, the digital watermark information DC is embedded (the polarity is "0").

When $|S| < TH$, the digital watermark information DC is not embedded.

When $S \geq TH$, the digital watermark information DC is embedded (the polarity is "1"). (16)

As indicated by expression (16), the digital watermark information DC can be detected from the input signal DV2.

By way of example, when copying the digital video signal DV2 received via the medium such as satellite or terrestrial waves from a broadcasting station, or a cable, or the digital video signal DV2 obtained by playing back an optical disk or the like, copy control can be performed based on the digital watermark information DC. In addition, for a source that may be unlawfully copied, the digital watermark detecting device 150 is designed to find out the origin of the source.

Digital Watermark Detecting Process

Figure 14:
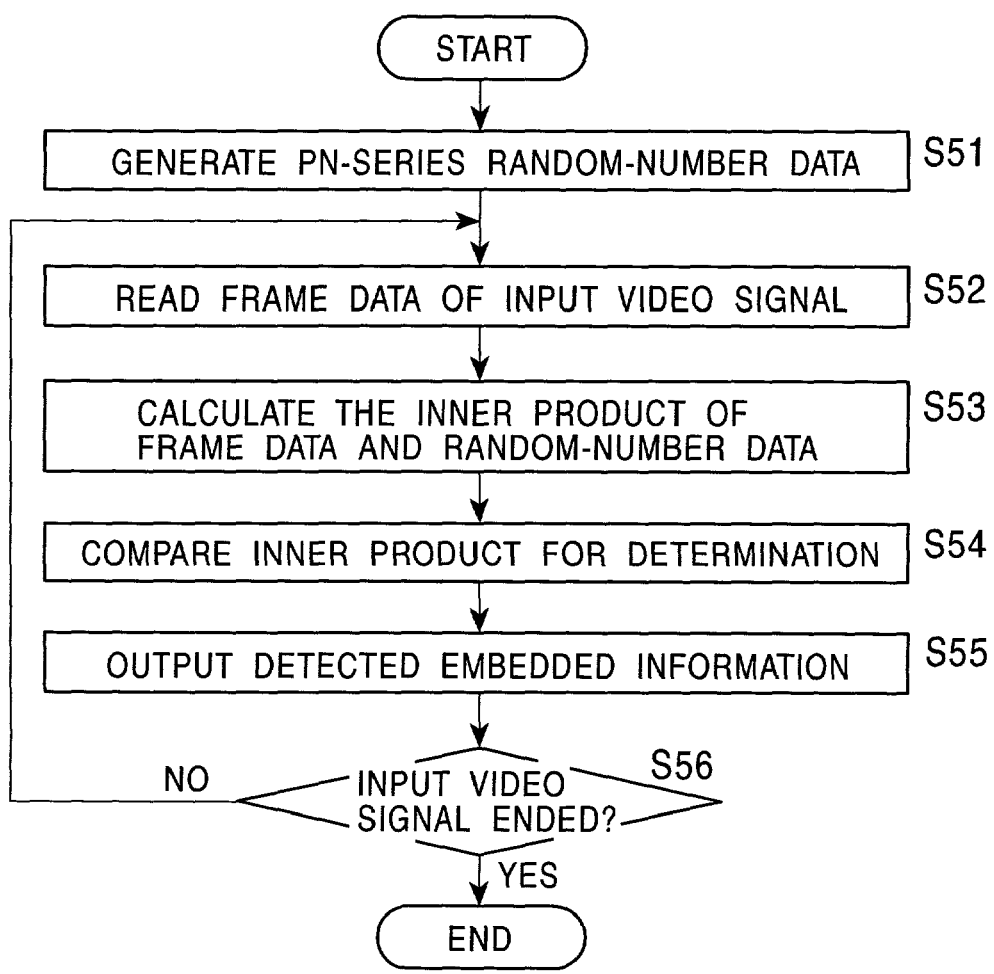
FIG. 14 is a flowchart illustrating an example of a process by the digital watermark detecting device of the present invention.

Next, a process that the digital watermark detecting device 150 executes is described with reference to the flowchart shown in FIG. 14. The steps of the process are described below.

In step S51, the digital watermark detecting device 150 generates PN-series random-number data PN. In step S52, the digital watermark detecting device 150 sequentially reads frame data such as the digital video signal DV2. In step S53, the digital watermark detecting device 150 calculates the inner product S of the input frame data and the random-number data PN, and outputs the calculated inner product S.

In step S54, by comparing the inner product S with a set threshold value (TH), the digital watermark detecting device 150 determines whether the digital watermark information DC is embedded, and determines, if the digital watermark information DC is embedded, the polarity of the embedded digital watermark information DC. In other words, for the nonnegative threshold value TH, based on the determination in expression (14), the digital watermark information DC can be detected from the input signal. In step S55, the digital watermark detecting device 150 outputs the digital watermark information DC detected as described above.

Proceeding to step S56, the digital watermark detecting device 150 determines whether it has completed the processing of the input signal. If the result of the determination is negative, the digital watermark detecting device 150 returns to step S52, and processes the input signal by sequentially repeating similar steps for each input data. In step S56, if the result of the determination in step S56 is affirmative, the digital watermark detecting device 150 terminates the process.

System Configuration

Figure 15:
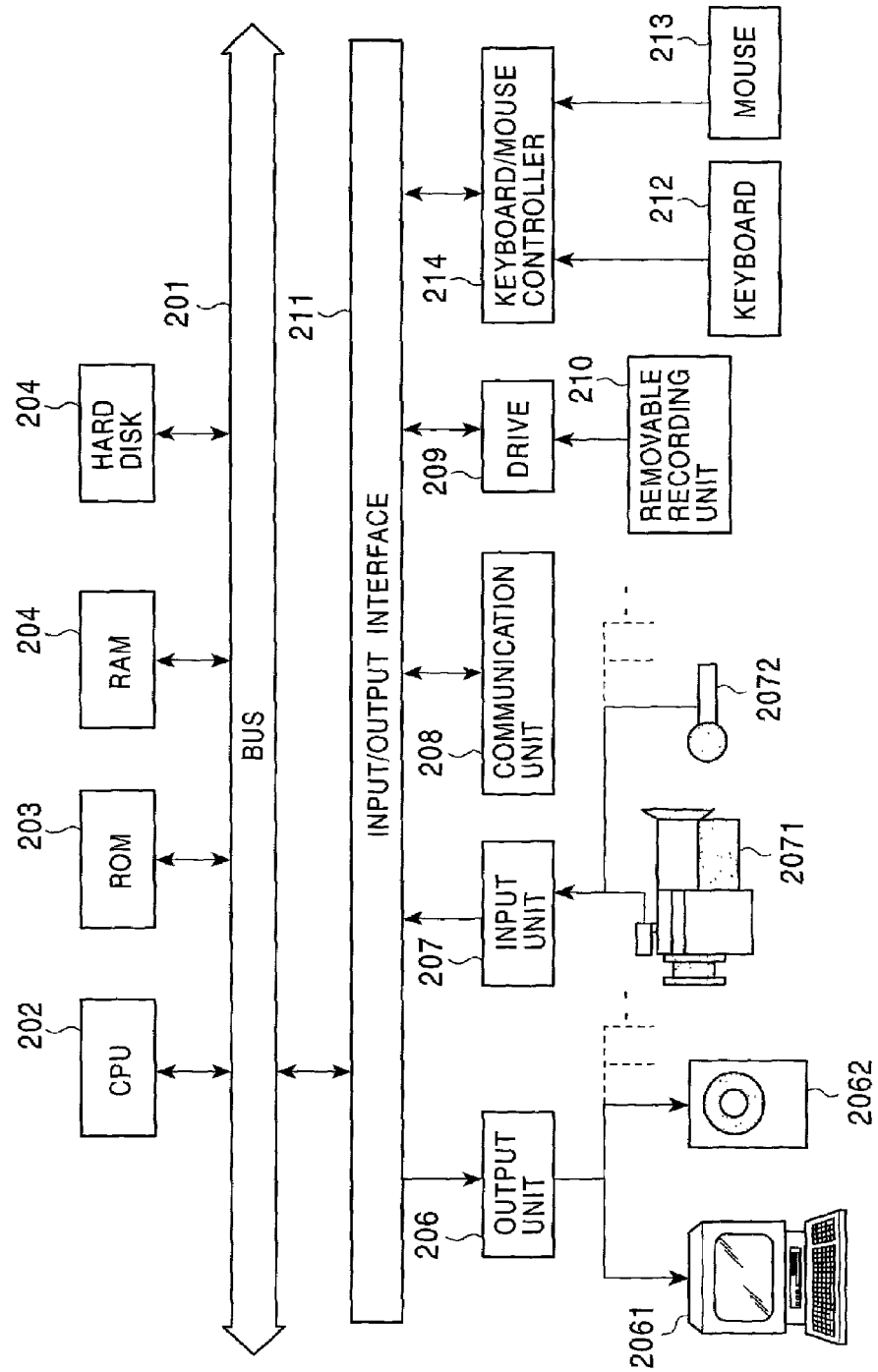
FIG. 15 is a block diagram showing an example of a system that executes at least one of digital watermark embedding and detection.

The above-described consecutive processing can be implemented by hardware, software, or a combination of both. For executing a process using software, it can be executed by installing, into a memory of a data processor built into dedicated hardware, a program containing a processing sequence, or by installing a program into a general-purpose computer that can execute various processes. For using software to execute the consecutive processing, programs constituting the software are installed into, for example, a general-purpose computer or a single-chip microcomputer. FIG. 15 shows an example of the system configuration of an apparatus that executes the consecutive processing, specifically, at least one of digital watermark embedding and digital watermark detection.

The system includes a central processing unit (CPU) 202. The CPU 202 actually executes various applications and an operating system. The system includes a read-only memory (ROM) 203. The ROM 203 stores a program executed by the CPU 202, or fixed data as arithmetic parameters. The system includes a random access memory (RAM) 204. The RAM 204 is used as a storage or work area for the program executed by the CPU 202, and parameters that change as required in program processing. The CPU 202, the ROM 203, the RAM 204, and a hard disk 205 are connected to one another by a bus 201, whereby data can be mutually transferred. In addition, data can be transferred from/to various input/output units connected to an input/output interface 211.

A keyboard 212 and a mouse 213 are operated by a user in order to input various commands and data to the CPU 202. The commands and data are input via a keyboard/mouse controller 214.

A drive 209 performs recording to or playback of a removal recording unit 210 such as a floppy disk, a compact-disk read-only memory (CD-ROM), a magneto-optical (MO) disk, a magnetic disk, or a semiconductor memory. The drive 209 performs playback of a program or data from each type of the recording unit 210, and performs storage of a program or data to each type of the recording unit 210.

When a command is input from the keyboard 212 or the mouse 213 to the CPU 202 via the input/output interface 211, the CPU 202 executes the program stored in the ROM 203 in accordance with the input command.

In the above embodiment, a signal for use in digital watermark embedding, or a signal for use in digital watermark detection can be input from an input device connected to an input unit 207, such as a camera 2071 or a data input device, for example, a scanner, or from the removal recording unit 210 connected to the drive 209. Audio data can be also input by using a microphone 2072. In addition, data that is received by a communication unit 208 can be used as data to which a digital watermark pattern is embedded or as data from which a digital watermark pattern is detected.

Not only a program stored in the ROM 203, but also a program stored in the hard disk 205, a program installed after the program is transferred from a satellite or a network and is received by the communication unit 208, or a program installed into the hard disk 205 after the program is read from the removal recording unit 210 when it is loaded into the drive 209 can be loaded into the RAM 204 and executed by the CPU 202.

In the system shown in FIG. 15, the CPU 202 performs processing in accordance with each modification of the above embodiment, each of the above block diagrams, or each of the above flowcharts. The CPU 202 uses, for example the input/output interface 211 to output the result of the processing to a display unit 2061 such as a liquid crystal display or a cathode-ray tube and to a speaker 2062 via an output unit 206. Also, processing data can be transmitted from the communication unit 208, and can be stored in a recording medium such as the hard disk 205.

Each process-executing program can be recorded beforehand in the hard disk 205 and the ROM 203 as recording media incorporated into the system. Alternatively, the program can be temporally or eternally stored (recorded) in the removal recording unit 210. The removal recording unit 210 can be provided as so-called "package software".

The program can be installed from the removal recording unit 210 into a computer. In addition, by using a digital broadcasting satellite to transfer the program from a download site to a computer by radio, or using a network such as a local area network or the Internet to transfer the program by wire, the computer can use the communication unit 208 to receive the transferred program and can install the program into the hard disk 205.

In this Specification, processing steps constituting each program for controlling the computer to perform each process do not always need to be processed in a temporally sequential order in the form of a flowchart, and include processes (e.g., parallel processes or object oriented processes) that are executed in parallel or separately.

The program may be processed by a single computer or may be processed in a distributed form by a plurality of computers. The program may be transferred and executed by a remote computer.

The above embodiment describes a case in which, between two temporally sequential digital video signals, the absolute values of differences between corresponding pixel levels are calculated and totaled. However, the present invention is not limited thereto, but can be widely applied to, for example, the case of using mutual correlation in which, between corresponding pixels, the products of their levels and totaled.

The above embodiment describes the case of performing motion detection by using picture matching between two temporally sequential digital video signals. However, the present invention is not limited thereto, but may be widely applied to, for example, the case of performing motion detection by using the inclinations and phase correlation of two temporally sequential digital video signals.

The above embodiment describes the case of performing motion detection by using two temporally sequential digital video signals. However, the present invention is not limited thereto, but may be widely applied to, for example, the case of performing motion detection by using picture correlation among at least three temporally sequential digital video signals. This enables detection of a motion having a slight change in the time domain.

The above embodiment describes the case of performing motion detection by using two temporally sequential digital video signals. However, the present invention is not limited thereto, but may be widely applied to, for example, the case of performing motion detection by using block correlation after dividing a digital video signal into blocks. This enables motion detection matching human visual characteristics since the motion vector of each block is evaluated.

The above embodiment describes the case of performing motion detection for frame signals s digital video signals. However, the present invention is not limited thereto, but may be widely applied to, for example, the case of performing motion detection for field signals as digital video signals. In this case, motion detection for each field signal may be performed, or motion detection for each specified field signal may be performed. This enables motion detection based on a reduced number of arithmetic operations.

The above embodiment describes a case in which, for picture analyzing considering human visual characteristics, motion information is detected from a digital video signal, and a digital watermark pattern is moved to follow the motion information. However, the present invention is not limited thereto, but may be widely applied to, for example, the case of detecting edge information on a digital video signal and modulating a digital watermark pattern, the case of performing processing by analyzing various types of information such as brightness information and color information on a digital video signal, and the case of performing picture analyzing by combining the first and second cases.

The above embodiment describes the case of generating a digital watermark pattern by using random-number data to process copyright information by a spread spectrum method and adding the digital watermark pattern to a picture represented by a digital video signal. However, the present invention is not limited thereto, but may be widely applied to various digital watermark embedding methods that superimpose digital watermarks on base-band signals in digital video signals, and to various digital watermark embedding methods that superimpose digital watermarks on bit-stream signals in digital video signals.

The above embodiment describes the case of using PN-series random-number data to process copyright information by a spread spectrum method. However, the present invention is not limited thereto, but may be widely applied to cases that, by using various numerical patterns the sum of which is statistically zero, modulate copyright information so that it cannot be analyzed.

The above embodiment describes the case of superimposing copyright information. However, the present invention is not limited thereto, but may be widely applied to cases in which various types of information are transmitted in a superimposed form, as required.

The above embodiment describes the case of transmitting a digital video signal from a broadcasting station by using a medium such as satellite or terrestrial waves or a cable, and the case of recording and playing back a digital video signal on an optical disk. However, the present invention is not limited thereto, but may be widely applied to, for example, the case of using the Internet to transmit various types of information.

The present invention has been fully described with reference to a specified embodiment. However, it is obvious that a person skilled in the art can correct and substitute the embodiment within departing the gist of the present invention. In other words, the present invention has been disclosed in the form of exemplification, and should not be limitedly interpreted. To understand the gist of the present invention, the appended Claims should be considered.

The steps described in this Specification are not only executed in temporally sequential order but also may be executed in parallel or separately in accordance with the processing ability of an executing apparatus or as required. In this Specification, the "system" is a logical set of a plurality of apparatuses and the apparatuses are not always accommodated in a single housing.

What is claimed is:

1. A digital watermark embedding device for embedding digital watermark information in a picture signal, said digital watermark embedding device comprising:

digital-watermark-pattern generating means for generating a digital watermark pattern based on embedding information;

motion detecting means for detecting motion associated with an entire frame of the picture signal by (i) calculating, for each respective pixel in the associated frame of the picture signal, an absolute value of a difference in brightness values between that pixel and a corresponding pixel of an earlier frame of the picture signal, the corresponding pixel being determined using a given motion vector in a motion vector search range, (ii) summing the absolute values of the differences over the entire frame to obtain an index of frame-to-frame correlation that is associated with the given motion vector, (iii) repeating (i) and (ii) for each motion vector in the motion vector search range, (iv) selecting the motion vector having the smallest associated index of frame-to-frame correlation;

modulating means for modulating the digital watermark pattern over the entire associated frame of the picture signal using the selected motion vector; and embedding means for embedding the modulated digital watermark pattern in the picture signal.

2. The digital watermark embedding device according to claim 1, wherein said modulating means modulates the digital watermark pattern after setting a motion-following amount in proportion to a magnitude of the motion.

3. The digital watermark embedding device according to claim 1, wherein when the selected motion vector represents a moving picture, said modulating means modulates the digital watermark pattern after randomly setting the motion-following amount.

4. The digital watermark embedding device according to claim 1, wherein when the selected motion vector is in a predetermined range between a and b, where (0<a<b), said modulating means modulates the digital watermark pattern, and when the selected motion vector is in a range between zero and a or is greater than or equal to b, said modulating means does not modulate the digital watermark pattern.

5. The digital watermark embedding device according to claim 1, wherein a motion vector between predetermined blocks of frames of said picture signal is selected by said motion detecting means.

6. The digital watermark embedding device according to claim 1, wherein when the selected motion vector represents a moving picture, said modulating means sets a larger embedding intensity for the digital watermark information, and when the selected motion vector represents a still picture, said modulating means sets a smaller embedding intensity for the digital watermark information.

7. A digital watermark embedding method for embedding digital watermark information in a picture signal, said method comprising:

generating a digital watermark pattern based on embedding information;

detecting motion associated with an entire frame of the picture signal by (i) calculating, for each respective pixel in the associated frame of the picture signal, an absolute value of a difference in brightness values between that pixel and a corresponding pixel of an earlier frame of the picture signal, the corresponding pixel being determined using a given motion vector in a motion vector search range, (ii) summing the absolute values of the differences over the entire frame to obtain an index of frame-to-frame correlation that is associated with the given motion vector, (iii) repeating (i) and (ii) for each motion vector in the motion vector search range, (iv) selecting the motion vector having the smallest associated index of frame-to-frame correlation;

modulating the digital watermark pattern over the entire associated frame of the picture signal using the selected motion vector; and embedding the modulated digital watermark pattern in the picture signal.

8. A method according to claim 7, wherein said modulating step is executed after setting the motion-following amount in proportion to a magnitude of motion.

9. A method according to claim 7, wherein when the selected motion vector represents a moving picture, said modulating step is executed after randomly setting the motion-following amount.

10. A method according to claim 7, wherein when the selected motion vector is in a predetermined range between a and b, where (0<a<b), said modulating step is executed, and when the selected motion vector is in a range between zero and a or is greater than or equal to b, said modulating step is not executed.

11. A method according to claim 7, wherein a motion vector between predetermined blocks of frames of said picture signal is selected in said motion detecting step.

12. A method according to claim 7, wherein, when the selected motion vector represents a moving picture, said modulating step includes setting a large embedding intensity for the digital watermark information, and when the selected motion vector represents a still picture, said modulating step includes setting a small embedding intensity for the digital watermark information.

* * * * *